US011868929B2

(12) United States Patent
Fong et al.

(10) Patent No.: US 11,868,929 B2
(45) Date of Patent: Jan. 9, 2024

(54) OPTIMIZING ENGAGEMENT OF TRANSPORTATION PROVIDERS

(71) Applicant: Lyft, Inc., San Francisco, CA (US)

(72) Inventors: Janette Yuen-Sum Fong, San Francisco, CA (US); Joanna Mun Yee Chan, Redwood City, CA (US); Bao Kham Chau, Oakland, CA (US); Dennis Li, San Francisco, CA (US); Alex Collier Mazure, San Francisco, CA (US); Jonathan Patrick O'Keefe, Oakland, CA (US); Ko-Ay Timmy Siauw, Seattle, WA (US); Anthony Michael Padin, South San Francisco, CA (US); Harel Sheniak, San Francisco, CA (US); Samuel Soffes, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 298 days.

(21) Appl. No.: 16/164,769

(22) Filed: Oct. 18, 2018

(65) Prior Publication Data

US 2020/0126175 A1 Apr. 23, 2020

(51) Int. Cl.
*G06Q 10/0631* (2023.01)
*G06Q 50/30* (2012.01)

(52) U.S. Cl.
CPC ..... *G06Q 10/063112* (2013.01); *G06Q 50/30* (2013.01)

(58) Field of Classification Search
None
See application file for complete search history.

(56) References Cited

U.S. PATENT DOCUMENTS

| 2006/0059023 A1* | 3/2006 | Mashinsky | G06Q 10/02 |
| | | | 705/5 |
| 2009/0089096 A1* | 4/2009 | Schoenberg | G16H 10/60 |
| | | | 705/3 |

(Continued)

OTHER PUBLICATIONS

Ying-Hong Wang, Wen-Nan Wang, Chen-An Wang and An-Cheng Cheng, "An agent based e-marketplace over e-business," First International Symposium on Cyber Worlds, 2002. Proceedings., Tokyo, Japan, 2002, pp. 303-310, doi: 10.1109/CW.2002.1180894. (Year: 2002).*

*Primary Examiner* — Stephanie Z Delich
(74) *Attorney, Agent, or Firm* — Keller Preece PLLC

(57) ABSTRACT

The present application discloses an improved transportation matching system, and corresponding methods and computer-readable media. According to the disclosed embodiments, the transportation matching system identifies low engagement transportation providers by analyzing information associated with the transportation providers to generate engagement levels. Furthermore, the system identifies an optimal match between a low engagement transportation provider (regardless of whether the transportation provider is online or offline) and a scheduled transportation request by utilizing attributes associated with a scheduled transportation request and attributes associated with transportation providers to generate rankings for the transportation providers. Additionally, the system provides the scheduled transportation request exclusively to a selected transportation provider based on the generated rankings.

20 Claims, 12 Drawing Sheets

(56) References Cited

U.S. PATENT DOCUMENTS

| | | | | |
|---|---|---|---|---|
| 2009/0132754 | A1* | 5/2009 | Riska | G06F 3/0611 |
| | | | | 711/103 |
| 2009/0313076 | A1* | 12/2009 | Schoenberg | G16H 40/67 |
| | | | | 705/2 |
| 2011/0069821 | A1* | 3/2011 | Korolev | H04M 3/5141 |
| | | | | 379/88.04 |
| 2014/0140495 | A1* | 5/2014 | Ristock | H04M 3/5232 |
| | | | | 379/265.05 |
| 2014/0180764 | A1* | 6/2014 | Lehmann | G06Q 30/0203 |
| | | | | 705/7.32 |
| 2015/0161554 | A1* | 6/2015 | Sweeney | G06Q 50/30 |
| | | | | 705/7.15 |
| 2015/0339923 | A1* | 11/2015 | Konig | H04L 67/12 |
| | | | | 701/522 |
| 2016/0078394 | A1* | 3/2016 | Fuldner | H04W 4/023 |
| | | | | 705/7.15 |
| 2017/0124506 | A1* | 5/2017 | Khan | G06Q 10/063112 |
| 2017/0220966 | A1* | 8/2017 | Wang | G06Q 10/08 |
| 2017/0309092 | A1* | 10/2017 | Rosenbaum | G01M 17/007 |
| 2018/0012151 | A1* | 1/2018 | Wang | G06Q 10/0639 |
| 2018/0017405 | A1* | 1/2018 | Chen | H04W 4/40 |
| 2018/0096445 | A1* | 4/2018 | Eyler | G06Q 50/30 |
| 2018/0300660 | A1* | 10/2018 | Coan | G01C 21/26 |
| 2019/0197430 | A1* | 6/2019 | Arditi | G01C 21/3438 |

\* cited by examiner

OPTIMIZING ENGAGEMENT OF TRANSPORTATION PROVIDERS

BACKGROUND

The popularity and utilization of mobile app-based transportation systems has grown significantly in recent years. Through such a transportation system, a requestor utilizes a requestor computing device to generate and send a transportation request including a pickup location and destination location. The system then matches the transportation request to a provider computing device associated with a transportation provider, after which the provider transports the requestor to the destination location. Not only do these transportation systems provide a number of benefits to people needing transportation, but they also provide employment to transportation providers. However, conventional systems suffer from a number of disadvantages associated with the engagement, retention, and education of transportation providers.

For example, although app-based transportation systems provide a number of advantages over traditional transportation companies (e.g., taxi companies), the use of mobile applications and electronic communications as the primary—and sometimes the only—forms of communication with transportation providers gives rise to a number of problems. In particular, the use of mobile applications to on-board and train new transportation providers results in an information gap that is discouraging for new transportation providers and prevents the new transportation providers from fully engaging with or learning how to use the transportation system. In some cases, this information gap might cause a new transportation provider to have a negative experience because the new transportation provider is unsure on how to best use the system or how to personally benefit from use of the system. These negative experiences can then cause the new transportation provider to stop logging into or otherwise using the system. As a result, the transportation system wastes computational resources in communicating with, creating accounts for, on-boarding, and managing new transportation providers that never or very rarely utilize the system. Because traditional methods for on-boarding new transportation providers are unavailable and not practical within the context of a mobile-app based transportation system, a need exists for improved computer technology that more efficiently manages and engages transportation providers using the computer systems of the mobile-app based transportation system.

BRIEF SUMMARY

One or more embodiments of the present disclosure provide benefits and/or solve one or more of the foregoing or other problems in the art with methods, systems, and non-transitory computer readable storage media that efficiently and intelligently engage transportation providers. For example, the disclosed systems analyze information associated with transportation providers to identify transportation providers that are inactive and/or infrequently active (e.g., providers that infrequently log into the system or who have not logged into the system for some time). For instance, the disclosed systems use the analyzed information to identify and engage transportation providers that are offline, rather than merely engaging transportation providers that are online (e.g., logged into the system and/or active within a mobile application associated with the system). Moreover, the disclosed systems identify engagement opportunities that are specifically tailored to each particular transportation provider and most likely to result in engagement by the transportation provider. In some embodiments, an engagement opportunity comprises a scheduled transportation request for a future time and location (as opposed to a real-time transportation request for immediate transportation) that is specifically tailored to a transportation provider because it is likely to result in engagement by the transportation provider even if the transportation provider is offline. Once the system identifies a scheduled transportation request for a transportation provider, the system can notify the provider (e.g., using a push notification) and then provides the provider exclusive access to the scheduled transportation request, regardless of whether the transportation provider is online (i.e., logged into the system and/or active within a mobile application of the system) or offline (i.e., signed out of the system or having closed a mobile application of the system), rather than making the scheduled transportation request (sometimes referred to as "transportation request") more widely available to multiple transportation providers or processing the scheduled transportation request using conventional dispatching systems/processes.

To illustrate, in one or more embodiments, the disclosed systems analyze attributes associated with transportation providers to determine an engagement level for each transportation provider and to identify a subset of transportation providers having an engagement level below an engagement threshold (e.g., transportation providers that have not been active on the system for a threshold period of time). Once the subset of transportation providers is identified, the disclosed systems select a particular transportation provider, regardless of whether the particular transportation provider is online or offline, from the subset to service a scheduled transportation request based on a generated ranking of the subset of transportation providers. In particular, the disclosed systems generate the ranking to represent a likelihood that each of the transportation providers would engage with the transportation system to complete the scheduled transportation request despite their current level of engagement with or inactivity on the system. Once a transportation provider is selected based on the ranking, the disclosed systems then provide the selected transportation provider exclusive access to the scheduled transportation request (e.g., through a push notification, and/or other system for claiming scheduled transportation requests).

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
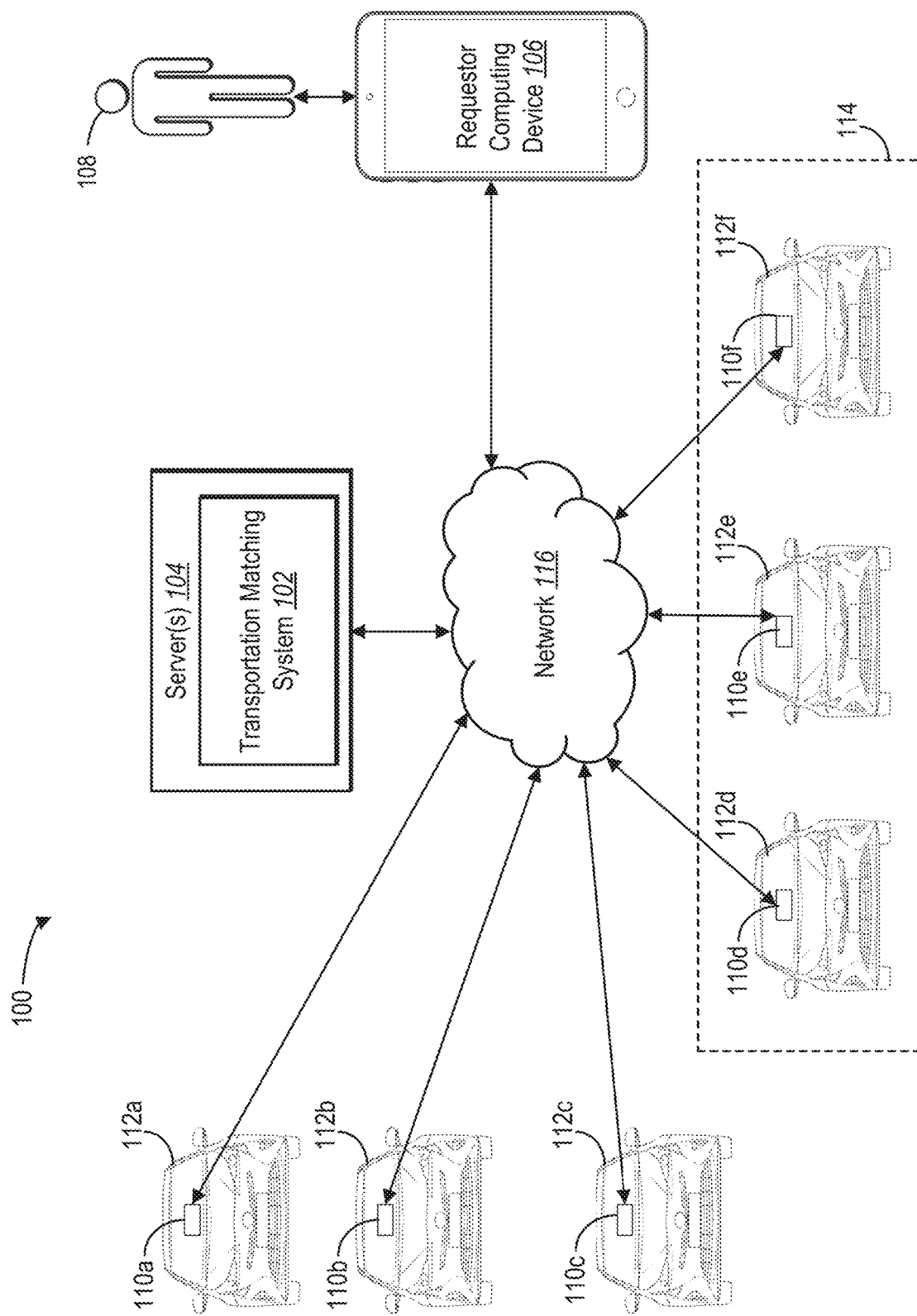
FIG. 1 illustrates a diagram of an environment in which a transportation matching system can operate in accordance with one or more embodiments.

This application discloses various embodiments of a transportation matching system, computer readable media, and corresponding methods that efficiently and accurately engage new and/or low engagement transportation providers. Although this disclosure often describes features from the perspective of a system, the disclosed features are also applicable to the disclosed methods and computer readable media. In one or more embodiments, the transportation matching system identifies low engagement transportation providers (e.g., providers that are not active or rarely active on the system) based on an analysis of information associated with the transportation providers. Additionally, in some embodiments, the transportation matching system generates a ranking for low engagement transportation providers in relation to a scheduled transportation request based on attributes of the scheduled transportation request and attributes of each transportation provider. Based on the generated rankings, the transportation matching system can determine an optimal one-to-one match between a transportation provider (that is online or offline) and a scheduled transportation request that is likely to be serviced by the transportation provider. Furthermore, in accordance with one or more embodiments, the transportation matching system provides the matched transportation provider with exclusive access to the scheduled transportation request to engage the transportation provider.

To illustrate, in one or more embodiments, the transportation matching system analyzes information associated with a set of transportation providers to determine an engagement level for each transportation provider. Indeed, the set of transportation providers can be online or offline (e.g., not active and/or not signed in on a mobile application associated with the transportation matching system). Furthermore, the transportation matching system identifies a subset of transportation providers that have engagement levels below an engagement threshold from the set of transportation providers. In addition to identifying low engagement transportation providers, the transportation matching system can also identify one or more reasons for low engagement a the transportation provider (e.g., identify an information gap associated with the transportation provider that prevents the transportation provider from engaging with the system or one or more attributes of past experiences of the transportation provider that may have discouraged the transportation provider from engaging with the system). Additionally, in some embodiments, the transportation matching system also identifies a scheduled transportation request that specifies at least a future request time (i.e., a future pick up time) and future request location (i.e., a future pickup location).

Then, in one or more embodiments, the transportation matching system selects a transportation provider to service the scheduled transportation request by generating a ranking for the subset of transportation providers based on attributes associated with the subset of transportation providers and attributes associated with the scheduled transportation request. Indeed, in one or more embodiments, the transportation matching system selects the transportation provider to service the scheduled transportation request based on the generated ranking. In one or more embodiments, the transportation matching system utilizes identified reasons for low engagement of transportation providers to generate rankings for the transportation providers.

Furthermore, in one or more embodiments, the transportation matching system provides exclusive access for the scheduled transportation request to the selected transportation provider, regardless of whether the transportation provider is online or offline. For example, if the selected transportation provider is offline, the transportation matching system can provide a push notification or offline communication (e.g., text message or email) to the transportation provider to inform the transportation provider of the opportunity to claim the scheduled transportation request. Furthermore, the transportation matching system can also provide exclusive access for claiming the scheduled transportation request to the selected transportation provider. For example, the transportation matching system can provide the selected transportation provider the exclusive opportunity to claim the scheduled opportunity (e.g., within an application, user interface, or portal for claiming scheduled transportation requests) without making the scheduled transportation request available to any other transportation providers, as will be described in greater detail below.

The disclosed transportation matching system provides several advantages over conventional systems. For example, the transportation matching system automatically identifies low engagement transportation providers and then generates optimal engagement opportunities to the low engagement transportation providers in way that is tailored for each transportation provider and likely to result in engagement with the transportation matching system. As a result, the transportation matching system can efficiently reduce the likelihood of transportation providers becoming inactive without computational resource waste such as storing information on inactive transportation providers, communicating with such devices for the transportation providers, and/or analyzing information (e.g., for potential dispatch) for the transportation providers that are inactive (or infrequently active). Thus, the transportation matching system more efficiently utilizes computational resources in comparison to conventional systems.

Additionally, the transportation matching system can match a transportation provider with a scheduled transportation request with increased accuracy and efficiency compared to some conventional systems. Indeed, by generating an optimal match between a scheduled transportation request and a transportation provider and providing the transportation provider with a notification that includes the scheduled transportation request match (regardless of whether the transportation provider is online or offline), the transportation matching system can increase the likelihood that the transportation provider will successfully service the scheduled transportation request. For example, by identifying and utilizing potential reasons for a provider's low engagement to generate rankings and/or select transportation providers for a scheduled transportation request, the transportation matching system increases the likelihood that the transportation provider will engage with the scheduled transportation request.

Accordingly, the transportation matching system can utilize less computational resources by accurately matching transportations providers to transportation requests compared to some conventional systems. In particular, the transportation matching system can utilize less computational resources because the transportation matching system can accurately match a transportation provider to a transportation request in a way that increases the likelihood that the matched transportation provider will complete the transportation request and avoids the computational expense of cancellations and then subsequently matching the transportation requests to other transportation providers. The disclosed transportation matching system also requires less resources by more narrowly targeting individual transportation providers without the need to communicate with and make a transportation request available to multiple transportation providers. Additionally, the transportation matching system 102 assists transportation providers in interacting and understanding the transportation matching system based on their past experiences (and any corresponding information gaps) to result in transportation providers more fully understanding and engaging with the transportation matching system.

Moreover, by including offline transportation providers that otherwise would not conventionally be available to match with a transportation service request since the transportation providers are not active online and available for transportation service requests, the transportation matching system utilizes a pool of transportation providers that is significantly larger than just matching with online transportation providers. More specifically, the transportation matching system can identify more optimal matches between transportation providers and scheduled transportation requests due to the transportation matching system utilizing a larger pool of transportation providers (i.e., both offline and online transportation providers).

Furthermore, by increasing engagement by providing low engagement transportation providers with scheduled transportation requests that are tailored to the transportation providers based on attributes of the transportation providers (e.g., the level of experience, previous activity, and other attributes discussed herein), the transportation matching system can also efficiently and accurately distribute transportation providers to service requests. Indeed, by generating optimal matches and providing the match regardless of the transportation provider being online or offline, the transportation matching system can increase the number of transportation providers in a region when there is a high period of transportation requests within a region because the transportation providers are more likely to engage with (e.g., log into) the transportation matching system in response to the matched request. Thus, the transportation matching system can result in a larger number of successfully serviced transportation requests with less computational resources (i.e., receiving transportation requests, computing matches, and not identifying a transportation provider for the received transportation request because of poor optimization and/or a lack of available transportation providers).

As used herein, the term "engagement level" refers to a representation (or amount) of activity of a transportation provider for servicing transportation requests. In particular, the term "engagement level" refers to a representation (or amount) that indicates how active (or inactive) a transportation provider is with regard to a transportation matching system. To illustrate, activity on the system can include logging into the system, opening a mobile application for the system, being active on or otherwise interacting with the mobile application for the system, being available for dispatch to service transportation requests, completing transportation requests, etc. Correspondingly, an engagement level can refer to a number of activities of a transportation provider (e.g., a number of requests completed, a number of miles driven, a number of active sessions within a mobile application, etc.), an amount of time of activity/inactivity (e.g., an amount of time a provider is logged into the system, an amount of time a provider is active on a mobile application for the system, an amount of time since the provider was last active on or logged into the system, etc.), a frequency of activity (e.g., how many transportation requests the provider completes each day/week/month, how many times the provider logs into or is active on the system each day/week/month, how many transportation requests the provider completes each time the provider is active on the system, etc.), or any other suitable activity metric. In other embodiments, an engagement level can be represented by a score that indicates the activity of a transportation provider. The score can be based on or representative of any activity or combination of activities. For instance, in some embodiments, the engagement level can be a numerical value that represents a categorical amount of engagement for a transportation provider (e.g., "2" representing low engagement, "1" representing normal engagement, and "0" representing high engagement) that is determined from an activity log for the transportation provider. Furthermore, in some embodiments, the engagement level is a ranking that represents the engagement of a transportation provider in relation to other transportation providers (e.g., transportation providers are ranked from most engaged to least engaged).

Furthermore, as used herein, the term "engagement threshold" refers to a threshold value or representation of activity of a transportation provider for servicing transportation requests that is determined to represent an indication of low (or sufficient) engagement for transportation providers. In particular, the term "engagement threshold" refers to a value or representation of activity of transportation providers for servicing transportation requests that is compared to an engagement level of a transportation provider to determine whether the transportation provider is engaged. Example engagement thresholds include threshold of time since a provider was last active on the system, a threshold number of serviced transportation requests, a threshold number of miles driven while logged into the system, a threshold amount of time active on/logged into the system, a threshold frequency of servicing transportation requests, a threshold frequency of being active on a mobile application associated with the system, a threshold of compensation made by the provider, or any other suitable threshold corresponding to activity associated with the transportation matching system. In some embodiments, the engagement threshold can be a threshold activity score, such as a numerical value that represents a category of engagement corresponding to associated activity scores.

Additionally, as used herein, the term "scheduled transportation request" refers to a transportation request that is configured by a requestor for a future pickup time and future pickup location. In particular, the term "scheduled transportation request" refers to transportation request that is configured by a requestor for a future pickup time and future pickup location that provides the transportation matching system with time to identify low engagement transportation providers and identify an optimal transportation provider for the transportation request after ranking the low engagement transportation providers. For example (as opposed to a real-time transportation request for immediate transportation), a scheduled transportation request can include a future request time for transportation at a future time (e.g., ten minutes later, two hours later, and/or a days later). Furthermore, in some embodiments, the scheduled transportation request can include a future request location that is at a different location than the location from which the requestor submitted the scheduled transportation request. Accordingly, scheduled transportation requests are unlike real-time or current transportation requests, which require immediate dispatch of a transportation provider to pick up a requestor from their current location (or a location near their current location).

FIG. 1, illustrates an example environment 100 for a transportation matching system 102 including a requestor computing device 106 associated with a requestor 108 and transportation provider computing devices 110a-110f (sometimes referred to as simply "provider computing devices") associated with transportation providers 112a-112f (sometimes referred to as simply "transportation providers"). As shown in FIG. 1, in one or more embodiments, the transportation matching system 102 can be implemented on one or more server(s) 104. As further shown in FIG. 1, the requestor computing device 106 and the transportation provider computing devices 110a-110f communicate with the transportation matching system 102 and/or each other via a network 116.

As shown in FIG. 1, server(s) 104 can include the transportation matching system 102. In particular, the transportation matching system 102 provides functionality to match transportation requests received from requestor computing devices to provider computing devices. Additionally, as discussed in more detail below, the transportation matching system 102 identifies and tailors engagement opportunities for transportation providers that have low engagement with the transportation matching system 102 (e.g., transportation providers that are offline and/or have been offline for a threshold amount of time). Indeed, the transportation matching system 102 can analyze information associated with transportation providers to determine an engagement level of each transportation provider to identify transportation providers having an engagement level below a predetermined threshold. Furthermore, the transportation matching system 102 can also generate a ranking of the identified transportation providers for a specific scheduled transportation request and then match a particular transportation provider to the scheduled transportation request based on the generated ranking, as will be explained in more detail below.

In one or more embodiments, the network 116 shown in FIG. 1 may include one or more networks and may use one or more communication platforms or technologies suitable for transmitting data and/or communication signals. In one or more embodiments, the network 116 includes a cellular network. Additionally or alternatively, the network 116 can include the Internet or World Wide Web. Additionally or alternatively, the network 116 can include various other types of networks that use various communication technologies and protocols, such as a corporate intranet, a virtual private network ("VPN"), a local area network ("LAN"), a wireless local network ("WLAN"), a wide area network ("WAN"), a metropolitan area network ("MAN"), or a combination of two or more such networks.

Furthermore, in some embodiments, the requestor computing device 106 and each of the transportation provider computing devices 110a-110f can include computing devices, such as, but not limited to mobile computing devices (e.g., a mobile phone), a tablet, and/or vehicle computing devices. Additionally, in some embodiments, the requestor computing device 106 and each of the transportation provider computing devices 110a-110f include transportation matching system applications. In one or more embodiments, the transportation matching system applications enable the users of the requestor computing device 106 and the transportation provider computing devices 110a-110f to interact with features of the transportation matching system 102. For instance, the requestor 108 can initiate transportation matching system application sessions, configure and send scheduled transportation requests, and receive additional information from the transportation matching system 102 via a transportation matching system application on the requestor computing device 106. Moreover, transportation providers 112a-112f can receive a scheduled transportation request and/or fulfill transportation requests using a transportation matching system application on transportation provider computing devices 110a-110f (respectively). Additionally, the transportation matching system 102 can match and provide the scheduled transportation request via a transportation matching system application regardless of whether the transportation providers 112a-112f are online and/or signed into the transportation matching system application on transportation provider computing devices 110a-110f. In at least one embodiment, the transportation matching system application on the requestor computing device 106 includes features specific to requestors, while transportation matching system applications on transportation provider computing devices 110a-110f include features specific to transportation providers.

In particular, the transportation matching system 102 can receive a scheduled transportation request from the requestor computing device 106 for the requestor 108. Furthermore, the transportation matching system 102 can determine engagement levels to identify transportation providers 112d-112f as belonging to a subset of low engagement transportation providers 114 from the transportation providers 112a-112f (e.g., all eligible transportation providers regardless of whether the providers are active within a transportation matching system application). Additionally, the transportation matching system 102 can generate rankings for the transportation providers 112d-112f in the subset of low engagement transportation providers 114 based on attributes of the scheduled transportation request from the requestor computing device 106 and the attributes of the transportation providers 112d-112f. Indeed, in one or more embodiments, the transportation matching system 102 selects a transportation provider from the subset of low engagement transportation providers 114 (i.e., the transportation providers that are identified as low engagement transportation providers) for the scheduled transportation request based on the generated rankings.

Figure 2:
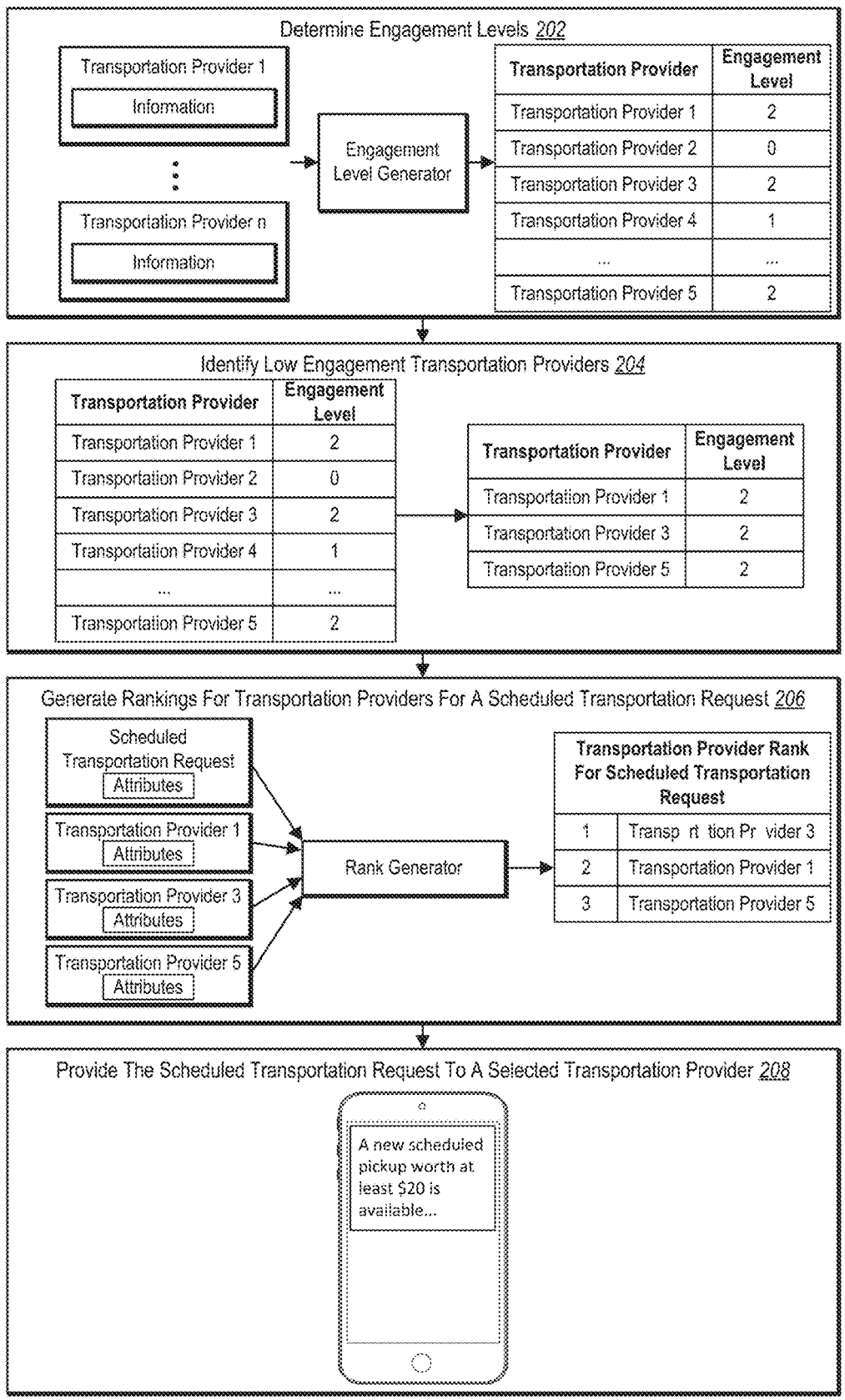
FIG. 2 illustrates a flow diagram for engaging transportation providers in accordance with one or more embodiments.

As just mentioned, the transportation matching system 102 can identify low engagement transportation providers and generate an optimal match between one of the identified low engagement transportation providers and a scheduled transportation request. For example, FIG. 2 illustrates the transportation matching system 102 generating a match between a scheduled transportation request and a transportation provider (that is identified as a low engagement transportation provider) in accordance with one or more embodiments. In particular, as shown in FIG. 2, the transportation matching system 102 can determine engagement levels for transportation providers and identify low engagement transportation providers (e.g., inactive and/or infrequently active transportation providers). Additionally, as illustrated in FIG. 2, the transportation matching system 102 can generate rankings for transportation providers for a scheduled transportation request and provide the scheduled transportation request to a selected transportation provider (based on the generated rankings).

More specifically, as shown in FIG. 2, the transportation matching system 102 performs an act 202 of determining engagement levels of transportation providers. For instance, the transportation matching system 102 can utilize information associated with a transportation provider (e.g., an activity log) to determine an engagement level. As shown in FIG. 2, in some embodiments, the transportation matching system 102 provides information associated with transportation providers to an engagement level generator that analyzes the information to generate an engagement level. Moreover, as shown in FIG. 2, the transportation matching system 102 can generate and assign an engagement level to each analyzed transportation provider. More detail for determining an engagement level for a transportation provider is provided in FIG. 3A below.

Additionally, as shown in FIG. 2, the transportation matching system 102 performs an act 204 of identifying low engagement transportation providers. For instance, as shown in FIG. 2, the transportation matching system 102 can utilize the determined engagement levels for the transportation providers to determine one or more low engagement transportation providers. In particular, the transportation matching system 102 can compare the engagement levels of the transportation providers to an engagement threshold (e.g., a value that is designated to indicate a low engagement transportation provider) to identify low engagement transportation providers. As shown in FIG. 2, the transportation matching system 102 can identify low engagement transportation providers and generate a subset of low engagement transportation providers (e.g., the transportation providers with an engagement level of "2"). Indeed, as mentioned above, the set of low engagement transportation providers can include both online and offline transportation providers. Additional detail for identifying a low engagement transportation provider is provided in FIG. 3B below.

Furthermore, as illustrated in FIG. 2, the transportation matching system 102 performs an act 206 of generating rankings for the transportation providers for a scheduled transportation request. For example, as shown in FIG. 2, the transportation matching system 102 can provide attributes associated with a scheduled transportation request and attributes associated with each individual transportation provider (e.g., the low engagement transportation providers) to a rank generator. Furthermore, in some embodiments, the transportation matching system 102 utilizes the rank generator (e.g., a scoring algorithm and/or a neural network) to analyze the attributes associated with the scheduled transportation request and the transportation providers. In one or more embodiments, the attributes associated with the transportation providers include reasons identified for low engagement (i.e., information gaps causing the transportation provider to not engage with the transportation matching system 102). As shown in FIG. 2, the transportation matching system 102 can generate a ranking of transportation providers for the scheduled transportation request (e.g., ordered from the most optimal transportation provider for the scheduled transportation request to the least optimal transportation provider). Moreover, in some embodiments, the transportation matching system 102 can rank and/or match transportation providers with scheduled transportation requests that include attributes that assist in resolving information gaps to engage the transportation providers. More detail for generating rankings for transportation providers for a scheduled transportation request is provided in FIG. 4.

In addition, as illustrated in FIG. 2, the transportation matching system 102 performs an act 208 of providing the scheduled transportation request to the selected transportation provider. For example, upon generating rankings for the low engagement transportation providers, the transportation matching system 102 selects a transportation provider for the scheduled transportation request based on the generated rankings. Furthermore, as shown in FIG. 2, after selecting the transportation provider for the scheduled transportation request, the transportation matching system 102 can provide a notification that indicates the availability of the scheduled transportation request and information for the scheduled transportation request to the selected transportation provider regardless of whether the transportation provider is currently active (e.g., online and/or signed in) within a transportation matching system application or transportation request portal. More detail for providing a scheduled transportation request to a selected transportation provider (based on the generated rankings) is provided in FIGS. 5 and 6.

Figure 3A:
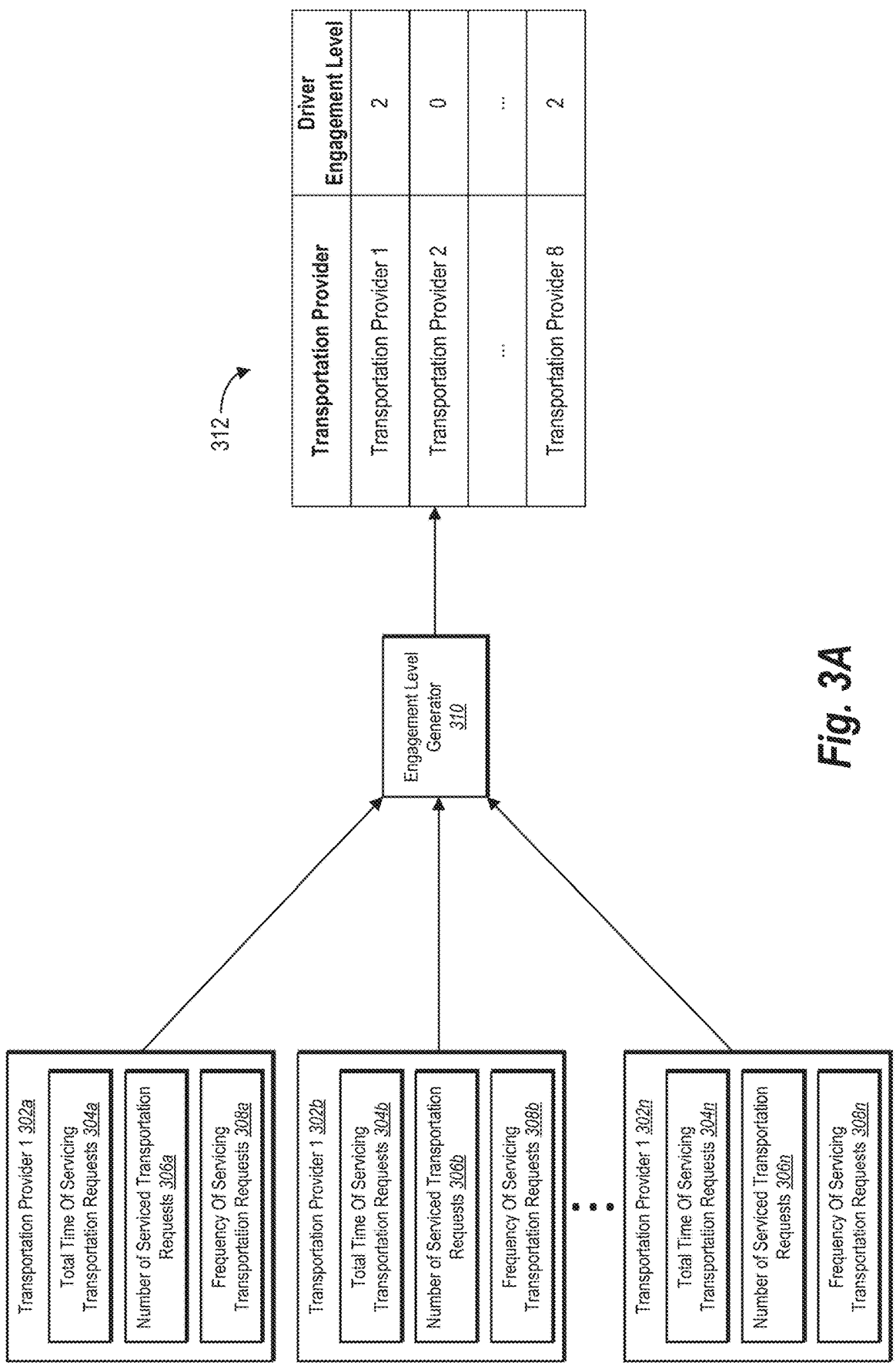
FIGS. 3A-3B illustrate a diagram of the transportation matching system identifying low engagement transportation providers in accordance with one or more embodiments.
Figure 3B:
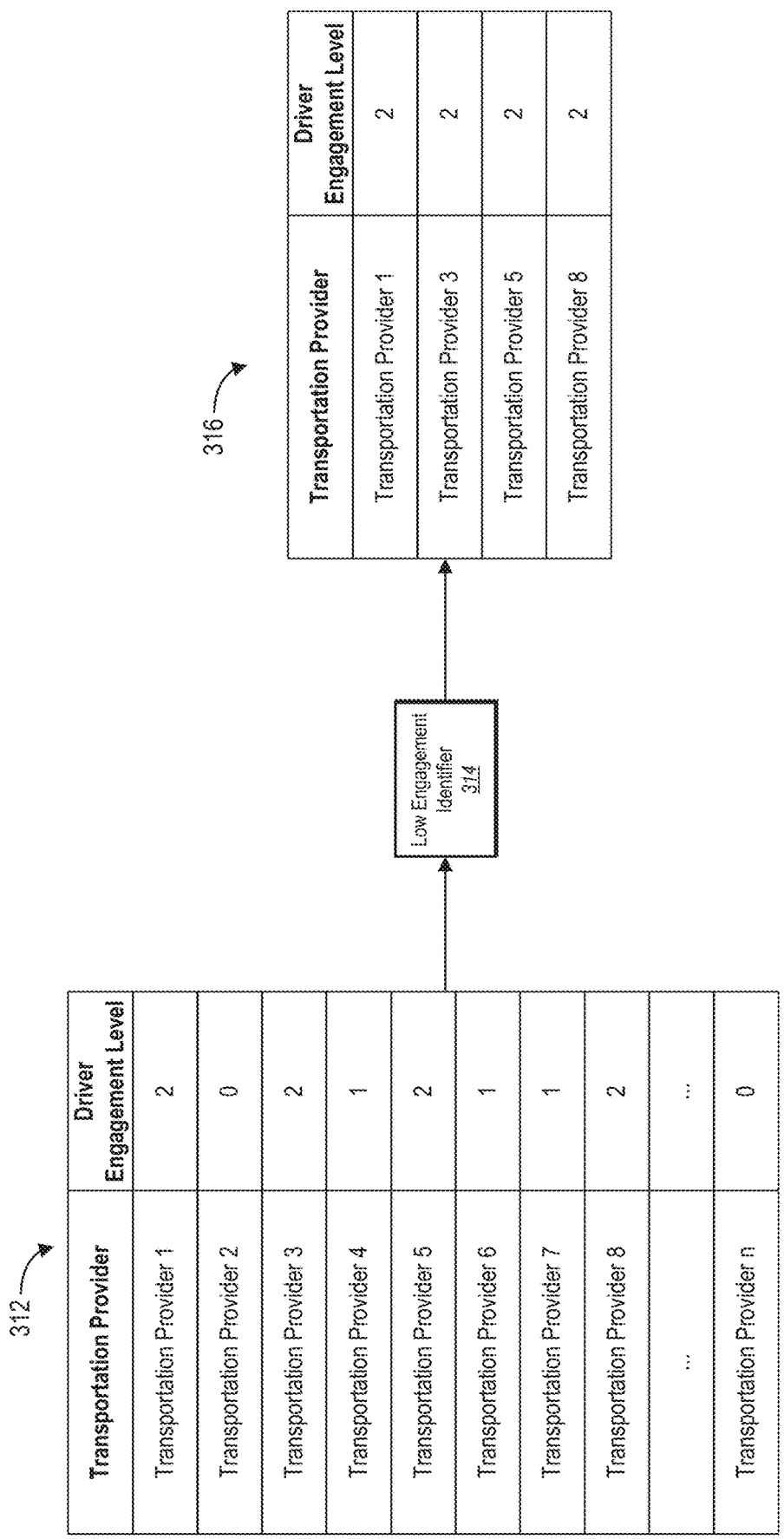

As mentioned above, the transportation matching system 102 can generate (or determine) engagement levels for transportation providers. Furthermore, as mentioned above, the transportation matching system 102 can utilize the engagement levels to identify low engagement transportation providers. For example, FIGS. 3A and 3B illustrate the transportation matching system 102 generating engagement levels for transportation providers and identifying low engagement transportation providers. Indeed, as shown in FIGS. 3A and 3B, the transportation matching system 102 can generate engagement levels for transportation providers by utilizing various information (or attributes) of the transportation providers and, then, utilize the engagement levels to identify low engagement transportation providers.

In some embodiments, the transportation matching system 102 generates engagement levels for all transportation providers that are within the transportation matching system 102 regardless of whether the transportation providers are online or offline (as opposed to conventional dispatch, which only considers active/online providers). Additionally, in one or more embodiments, the transportation matching system 102 generates engagement levels for transportation providers that are eligible to service transportation requests. Indeed, the transportation matching system 102 can generate engagement levels for all transportation providers and, as discussed below, generate a match between a transportation provider and a scheduled transportation request when the selected (or matched) transportation provider is offline (e.g., when the transportation provider is not utilizing the transportation matching system application).

In one or more embodiments, the transportation matching system 102 receives information associated with transportation providers from logs associated with the activity of the transportation providers. For instance, the transportation matching system 102 can receive information associated with transportation providers from logs associated with the transportation providers that are tracked and/or collected for transportation providers via the transportation provider computing devices. Indeed, the transportation matching system 102 can utilize logs such as a log of transportation requests completed by a transportation provider, a log of when the transportation provider was online with the transportation matching system, and a log of interactions with a mobile application associated with the transportation matching system.

The transportation matching system 102 can utilize information from the activity logs to determine specific information for the transportation providers. For example, the transportation matching system 102 can utilize the tracked logs from the transportation providers to determine information such as, but not limited to, an amount of time since the provider was last active on the system, a frequency of servicing transportation requests, a total time of servicing transportation requests, a number of serviced transportation requests, and/or an amount of time since the transportation provider's last serviced transportation request.

As shown in FIG. 3A, the transportation matching system 102 can include any number of transportation providers. Furthermore, the transportation matching system 102 can utilize any number of attributes associated with the transportation providers to determine (or generate) engagement levels. Additionally, the transportation matching system 102 can also utilize any combination of attributes to determine the engagement levels for transportation providers. Indeed, FIG. 3A illustrates the transportation matching system 102 utilizing information such as a total time of servicing transportation requests 304a-304n, a number of serviced transportation requests 306a-306n, and a frequency of servicing transportation requests 308a-308n associated with each transportation provider 302a-302n.

In some embodiments, as shown in FIG. 3A, the transportation matching system 102 utilizes the total time of servicing transportation requests associated with transportation providers to determine the engagement levels. For example, the total time of servicing transportation requests can include the accrual of time while a transportation provider actively services a transportation request. In some embodiments, the total time of servicing transportation requests includes the accrual of time while a transportation provider designates that the transportation provider is active on the transportation matching system 102 (i.e., available to service transportation requests). Furthermore, in one or more embodiments, the transportation matching system 102 can utilize various times (or various combinations of times) associated with the performance of a transportation provider during transportation requests to determine the engagement level.

In addition, the transportation matching system 102 can utilize a number of serviced transportation requests associated with transportation providers. For instance, as shown in FIG. 3A, the transportation matching system 102 can utilize the number of serviced transportation requests that are completed (fully executed) by each transportation provider. Furthermore, in some embodiments, the transportation matching system 102 can utilize the number of serviced transportation requests attempted by a transportation provider (e.g., the total completed and uncompleted and/or cancelled transportation requests). Indeed, in some embodiments, the transportation matching system 102 can utilize (or analyze) the number of uncompleted transportation requests (e.g., transportation requests that are abandoned and/or cancelled) to generate engagement levels for the transportation providers.

Additionally, the transportation matching system 102 can utilize the frequency of servicing transportation requests associated with the transportation providers to determine an engagement level. For instance, as shown in FIG. 3A, the transportation matching system 102 can utilize an average number of transportation requests per week associated with a transportation provider as the frequency of servicing transportation requests. In particular, the transportation matching system 102 can determine the average number of transportation requests by utilizing the number of transportation requests associated with a transportation provider and an amount of time associated with the transportation provider. For instance, the transportation matching system 102 can determine the average number of transportation requests serviced per week for a transportation provider by dividing the number of total transportation requests serviced by the transportation provider by the number of weeks the transportation provider has been active on the transportation matching system 102.

Moreover, in one or more embodiments, the transportation matching system 102 can utilize any time frame (e.g., months, weeks, days, and/or hours) to determine an average number of transportation requests within a time frame. Furthermore, the transportation matching system 102 can also determine an average for other attributes associated with the transportation providers such as, but not limited to, the number of transportation requests that are abandoned (or cancelled), driving time per transportation request, and/or a value associated with the serviced transportation requests (e.g., total revenue or compensation) as the frequency of servicing transportation requests. Indeed, in one or more embodiments, the transportation matching system 102 can utilize a calculated frequency of servicing transportation requests associated with the transportation provider to determine an engagement level with more accuracy (e.g., an average can provide insight into how active a transportation provider is on daily, weekly, or monthly basis).

In one or more embodiments, the transportation matching system 102 can determine and utilize an amount of time since a transportation provider's last serviced transportation request to determine an engagement level. For instance, the transportation matching system 102 can utilize (from the tracked logs of the transportation provider) a date (or time) that the transportation provider serviced a transportation request and determine the amount of time since that transportation request. Similarly, the transportation matching system 102 can determine an engagement level for a transportation provider based on an amount of time since the transportation provider last logged into the system or was active on a mobile application for the system.

Furthermore, the transportation matching system 102 can utilize other information associated with the transportation providers to determine an engagement level. For instance, in one or more embodiments, the transportation matching system 102 utilizes information such as, but not limited to, a travel distance, ratings, revenue, transportation provider feedback, demographics, and/or activity patterns associated with transportation providers. For example, the transportation matching system 102 can utilize the total amount of distance a transportation provider has traveled while servicing transportation requests. Furthermore, the transportation matching system 102 can utilize ratings provided by transportation requestors after the transportation provider services a transportation request. Additionally, the transportation matching system can also utilize revenue and/or income generated by a transportation provider to determine an engagement level. In addition, the transportation matching system 102 can also utilize feedback provided by transportation providers (e.g., survey responses) as an attribute to determine engagement levels. Furthermore, the transportation matching system can also utilize previous refusals to service scheduled transportation requests to determine engagement levels.

Moreover, as mentioned above, the transportation matching system 102 can utilize other activity patterns associated with the transportation providers to determine an engagement level. For example, the transportation matching system 102 can utilize information such as, but not limited to, times of servicing transportation requests and/or number of serviced transportation requests associated with each season of the year as an activity pattern (e.g., determining that a transportation provider is more active during the summer). Furthermore, other activity patterns may include information such as, but not limited to, the time of day when a transportation provider services transportation requests (e.g., a transportation provider that primarily services transportation requests before and after business hours), the locations at which transportation requests are primarily serviced by the transportation provider, and/or which days of the week the transportation provider services transportation requests (e.g., only on weekends, only on Monday, or only on weekdays). Indeed, the transportation matching system 102 can utilize a variety of information and/or any combination of information associated with the transportation providers to determine an engagement level for the transportation providers.

Furthermore, as mentioned above, the transportation matching system 102 can provide information associated with the transportation providers to an engagement level generator. Indeed, the transportation matching system 102 can utilize an engagement level generator to analyze information associated with the transportation providers and to determine engagement levels for the transportation providers. For example, as shown in FIG. 3A, the transportation matching system 102 provides the total time of servicing transportation requests 304a-304n, the number of serviced transportation requests 306a-306n, and the frequency of servicing transportation requests 308a-308n associated with the transportation providers 302a-302n to the engagement level generator 310. In one or more embodiments, the transportation matching system 102 utilizes the engagement level generator 310 to generate engagement levels for transportation providers based on information associated with transportation providers.

For instance, the transportation matching system 102 can utilize an engagement level generator that analyzes the information associated with the transportation providers with a scoring algorithm. In particular, the engagement level generator can generate a score for each transportation provider based on associated information. For example, in one or more embodiments, the engagement level generator can attribute weights and/or scores to each type of information associated with transportation providers and can also attribute weights and/or scores to the information (e.g., the values) associated with the transportation providers. For instance, the engagement level generator 310 can attribute a higher score to a transportation provider with a high amount of time servicing transportation requests. Indeed, the transportation matching system 102 can utilize the engagement level generator to generate scores for each transportation provider and determine an engagement level based on the generated scores. In some embodiments, the engagement level generator 310 can attribute a higher score and/or provide more weight to transportation providers that are offline.

Additionally, in one or more embodiments, the transportation matching system 102 utilizes an engagement level generator that analyzes the information associated with the transportation providers with a neural network that is trained to generate the engagement levels for the transportation providers. For instance, the transportation matching system 102 can utilize a neural network that analyzes and scores a variety of types of information associated with a transportation provider. Additionally, after analyzing the information, the transportation matching system 102 can further utilize the neural network to generate (or predict) engagement levels for the transportation providers.

Moreover, the transportation matching system 102 can utilize the engagement level generator to generate engagement levels based on various combinations of information associated with the transportation providers. For example, in one or more embodiments, the transportation matching system 102 utilizes the engagement level generator to compare and analyze information associated with each transportation provider to generate engagement levels for the transportation providers. In particular, the transportation matching system 102 can compare information associated with each transportation provider to other transportation providers to determine engagement levels that are relative to the transportation providers (e.g., a non-individual determination of an engagement level for a single transportation provider).

In addition, the transportation matching system 102 can receive generated engagement levels for the transportation providers from the engagement level generator. For example, the transportation matching system 102 utilizes the engagement level generator 310 to determine engagement levels for transportation providers and receives the engagement level dataset 312 for the transportation providers. As shown in FIG. 3A, the engagement level can be a numerical value that represents (or indicates) the engagement level of a transportation provider (e.g., amount of engagement). For example, as shown in FIG. 3A, the engagement level value of "2" can represent a low engagement transportation provider and an engagement level value of "0" can represent a high engagement transportation provider. Indeed, the transportation matching system 102 can receive an engagement level for transportation providers in various formats. For example, the engagement level generator can generate engagement levels in formats such as, but not limited to, numerical scores, letter grades, percentages, ordered lists (e.g., from most engaged to least engaged), and/or binary flags.

Additionally, the transportation matching system 102 can associate any combination of the information above to a transportation provider to represent a reason for the low engagement in the transportation provider. For example, the transportation matching system 102 can utilize information such as, but not limited to, previous activity, feedback from transportation providers, ratings for transportation providers from the requestors to identify and/or determine the reason for the low engagement. Indeed, in some embodiments, the transportation matching system 102 can reference such information from the transportation providers as the reason for low engagement. In some embodiments, the information to identify the reasons for low engagement and/or engagement level can include comments from requestors and/or the transportation providers that identify reasons for low engagement for the transportation providers. In one or more embodiments, the transportation matching system 102 can reference information that contributed (e.g., provided the most weight) towards identifying a transportation provider as a low engagement transportation provider as discussed below. Furthermore, the transportation matching system 102 can analyze information associated with past activity for a transportation provider to infer reasons for the low engagement. For example, the transportation matching system 102 can analyze attributes associated with a transportation provider's most recent activity, such as a most recently-completed transportation request, to identify one or more attributes that contributed to the transportation provider becoming inactive on the system. The problem attributes may include a time of a request, a location of the request, a value of the request, an attribute of the transportation requestor, or any other attribute associated with the request. The transportation matching system 102 can then utilize these problem attributes when generating a ranking for a scheduled transportation request (e.g., to decrease a ranking for a provider if the request has one or more of the problem attributes and/or to increase a ranking for a provider if the request does not have one or more of the problem attributes or has attributes that are different than or opposite to the problem attributes).

Furthermore, the transportation matching system 102 can utilize the generated engagement levels to determine various characteristics (e.g., such as low engagement) of the transportation providers. In particular, the transportation matching system 102 can utilize the generated engagement levels to determine whether a transportation provider is active, inactive, or infrequently active on the transportation matching system 102. For example, FIG. 3B illustrates the transportation matching system 102 utilizing the determined engagement levels to identify low engagement transportation providers.

For example, the transportation matching system 102 can provide a set of transportation providers with engagement levels to a low engagement identifier to identify low engagement transportation providers. In particular, as shown in FIG. 3B, the transportation matching system 102 provides a set of transportation providers with identified engagement levels 312 (i.e., the engagement levels determined in FIG. 3A) to the low engagement identifier 314. Furthermore, the transportation matching system 102 can utilize the low engagement identifier 314 to identify low engagement transportation providers based on engagement levels. Indeed, in some embodiments, the transportation matching system 102 utilizes the low engagement identifier 314 to select (or identify) transportation providers with an engagement level above (or below) a certain threshold (e.g., an engagement threshold). For example, as shown in FIG. 3B, the low engagement identifier sets a threshold of "2" or above as the threshold for low engagement transportation providers (i.e., an engagement score). As such, the transportation matching system 102 generates a dataset of low engagement transportation providers 316 (e.g., transportation providers having an engagement level of "2" or more). Although, FIGS. 3A and 3B illustrates engagement levels of "2" or more as an indication of a low engagement transportation provider, the transportation matching system 102 can utilize any numerical value scheme to represent low engagement transportation providers. For example, the transportation matching system 102 can utilize a numerical value scheme in which a higher numerical value corresponds to active transportation providers and a lower numerical value corresponds to low engagement transportation providers.

Moreover, in some embodiments, the transportation matching system 102 utilizes thresholds corresponding to the information of the transportation providers as an engagement threshold. For instance, in one or more embodiments, the transportation matching system 102 utilizes (or receives) a threshold total time of servicing transportation requests (e.g., a threshold driving time). Indeed, the transportation matching system 102 can utilize the threshold total time of servicing transportation requests to determine an engagement score (in the form of a threshold engagement level).

Additionally, the transportation matching system 102 can utilize (or receive) a threshold number of completed transportation requests (e.g., a determined number of transportation requests that indicate a transportation provider as active). Indeed, the transportation matching system 102 can utilize the threshold number of serviced transportation requests to determine an engagement threshold.

Moreover, the transportation matching system 102 can utilize (or receive) a threshold frequency of servicing transportation requests. For example, the threshold frequency of servicing transportation requests can include a threshold average number of transportation requests per week associated with a transportation provider as the threshold frequency of servicing transportation requests. Furthermore, the transportation matching system 102 can utilize the threshold frequency of servicing transportation requests to determine an engagement threshold.

Additionally, the transportation matching system 102 can utilize (or receive) a threshold amount of time corresponding to a time since a last serviced transportation request or a last time the provider logged into the transportation matching system 102 (e.g. using a transportation matching application). Indeed, the threshold amount of time corresponding to the time since the last activity can be utilized to determine if a transportation provider is a low engagement transportation provider if the amount of time since the transportation provider's last activity is greater than this threshold amount of time.

For example, the transportation matching system 102 can utilize the various thresholds corresponding to the information of the transportation providers to generate a numerical engagement threshold (i.e., similar to an engagement level and/or a threshold engagement score). For instance, referring to FIG. 3B, the transportation matching system 102 can utilize a threshold engagement score of "2" or above, such that the value "2" represents transportation providers that fail to have a threshold total time of servicing transportation requests and/or fail to have a threshold number of serviced transportation requests. In one or more embodiments, the transportation matching system 102 can utilize any combination and variety of information associated with transportation providers to generate an engagement threshold.

Additionally, although FIG. 3B illustrates the transportation matching system 102 identifying low engagement transportation providers based on a numerical score (or level) as the engagement level, the transportation matching system 102 can identify low engagement transportation providers utilizing various methods with various formats of determined engagement levels. For example, the transportation matching system 102 can receive a dataset of transportation providers that includes engagement levels as a score that increases (or decreases) as the transportation provider is identified to be more inactive and/or infrequently active. Indeed, the transportation matching system 102 can utilize the low engagement identifier to identify a threshold number of transportation providers (i.e., as the engagement threshold) with the highest (or lowest) engagement levels.

Moreover, in some embodiments, the transportation matching system 102 receives an ordered list from an engagement level generator. Indeed, the ordered list can represent the transportation providers from most engaged to least engaged (or vice versa). Furthermore, in one or more embodiments, the transportation matching system 102 determines a number of transportation providers to select from the ordered list (as the engagement threshold). Then, in one or more embodiments, the transportation matching system 102 selects the threshold amount of transportation providers from the ordered list as low engagement transportation providers.

Figure 4:
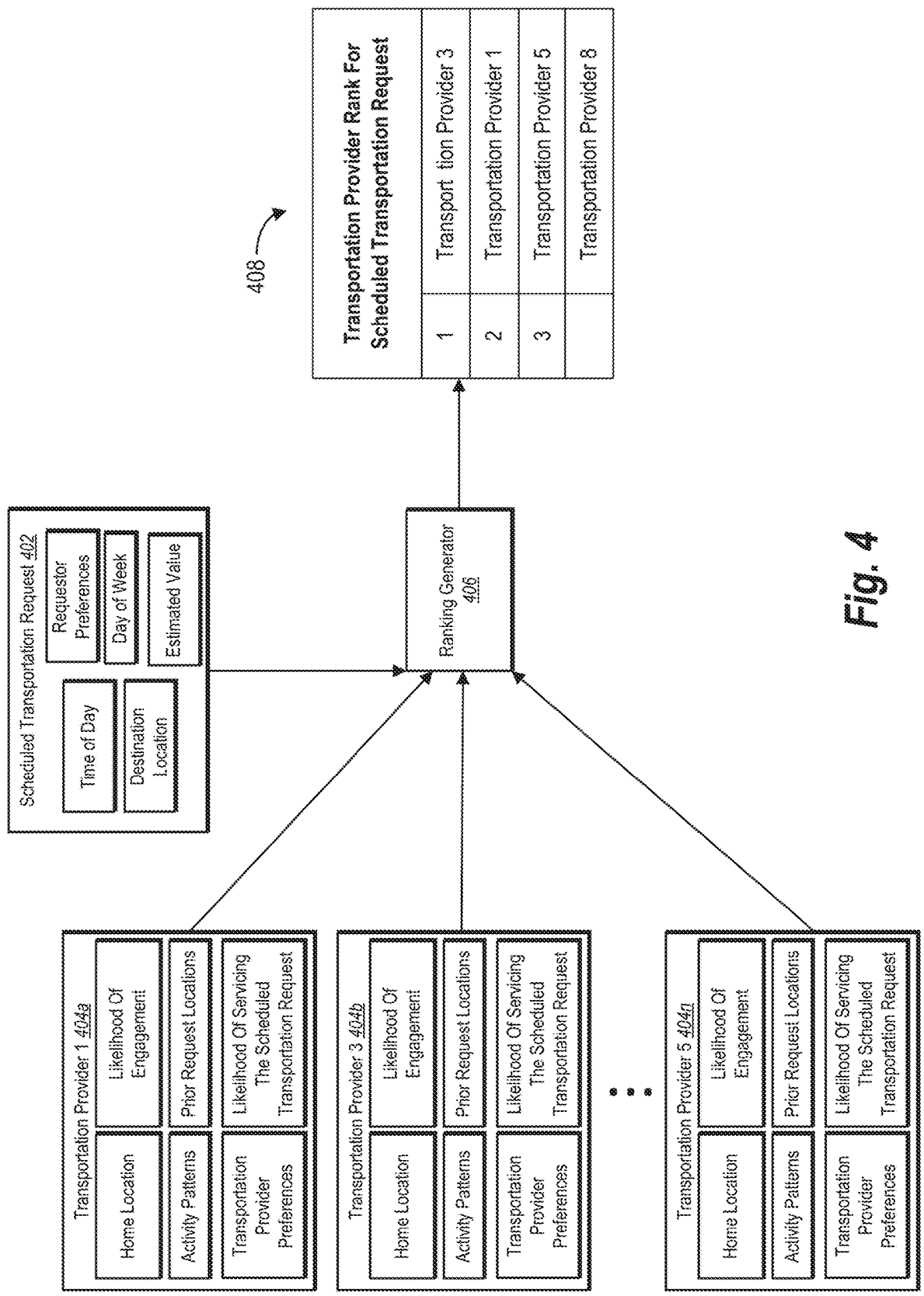
FIG. 4 illustrates a diagram of the transportation matching system generating rankings for transportation providers based on attributes of the transportation providers and attributes of a scheduled transportation request in accordance with one or more embodiments.

As mentioned above, the transportation matching system 102 can generate rankings for transportation providers for a scheduled transportation request. For example, FIG. 4 illustrates the transportation matching system 102 generating rankings for transportation providers for a scheduled transportation request based on attributes of the scheduled transportation request and the attributes of the transportation providers. In particular, the transportation matching system 102 can receive a scheduled transportation request that includes attributes and one or more transportation providers (e.g., identified low engagement transportation providers from FIG. 3B) that include attributes. Furthermore, the transportation matching system 102 can utilize a ranking generator that analyzes the attributes associated with both the scheduled transportation request and the transportation providers to determine an optimal transportation provider for the scheduled transportation request (and vice versa). As mentioned above, the transportation matching system 102 can generate rankings for transportation providers and can determine a transportation provider as the optimal transportation provider for the scheduled transportation request regardless of whether the transportation provider is online or offline at the time of the determination.

In one or more embodiments, the transportation matching system 102 receives a scheduled transportation request. In particular, the transportation matching system 102 receives a scheduled transportation request from a requestor 108 that includes a future request time (e.g., a selected pickup time) and a future request location (e.g., a selected pickup location). Indeed, in some embodiments, the transportation matching system 102 receives a scheduled transportation request which includes a future request time that is scheduled after a threshold amount of time (e.g., thirty minutes later, two hours later, and/or a day later). Furthermore, the scheduled transportation request also includes a selected pickup location that designates the beginning location of the transportation request route.

Additionally, the transportation matching system 102 can receive a scheduled transportation request that includes a variety of attributes. For example, as shown in FIG. 4, the transportation matching system 102 can receive a scheduled transportation request 402 which includes the time of day, destination location, estimated value of the scheduled transportation request, passenger (or requestor) preferences, and day of week as the attributes. In particular, the scheduled transportation request 402 can specify, in addition to the request time, a time of day that includes information such as, but not limited to, what part of the day (or event) will scheduled transportation request be during (e.g., day time, lunch time, night time, end of a sporting event, and so forth). Furthermore, the scheduled transportation request 402 can specify the destination location that includes information such as, but not limited to, the distance between the request location and the destination location. In some embodiments, the scheduled transportation request 402 can include the amount of traffic on the route, the number of turns on the route, and/or the number of stop lights on the route of the scheduled transportation request. Indeed, the transportation matching system 102 can analyze the time of day and the destination location with other attributes (from the scheduled transportation request and the transportation providers) to generate a ranking for the transportation providers.

Moreover, as shown in FIG. 4, the scheduled transportation request 402 can also include an estimated value as an attribute. In particular, the transportation matching system 102 can receive an estimated value (e.g., the estimated amount of compensation that a transportation provider will receive for servicing the scheduled transportation request) as an attribute of the scheduled transportation request 402. For instance, the estimated value can include an average fare for the route in the scheduled transportation request. In some embodiments, the estimated value can also include estimated bonuses and/or other estimated revenues provided by the requestor for the scheduled transportation request.

Additionally, as illustrated in FIG. 4, the scheduled transportation request 402 can include passenger preferences as attributes. In particular, the transportation matching system 102 can receive passenger preferences such as, but not limited to, vehicle preferences and/or pet friendly transportation preferences. For example, the transportation matching system 102 can receive a scheduled transportation request in which the requestor has indicated that the requestor wants a pet friendly vehicle (e.g., the transportation provider allows pets). Also, in some embodiments, the transportation matching system 102 can receive a scheduled transportation request in which the requestor has indicated that the requestor wants a larger car (e.g., a minivan or SUV). Indeed, the transportation matching system 102 can utilize a scheduled transportation request that includes a variety of other passenger preferences such as, but not limited to, whether the vehicle is smoke friendly, whether the vehicle is food friendly, music, requestor group size, and/or whether the vehicle has luggage space. Furthermore, the transportation matching system 102 can receive a scheduled transportation request that includes a variety of passenger preferences and/or any combination of passenger preferences.

In addition, the scheduled transportation request can include transportation provider resource information that is associated with the future request location corresponding to the scheduled transportation request. For example, the transportation provider resource information can include the number of transportation providers that service transportation requests in the proximity of the future request location (e.g., a determined proximity such a 1-mile radius). Furthermore, the transportation provider resource information can also include a the number of transportation providers that service transportation requests in the proximity of the future request location at the future request time of the scheduled transportation request.

Additionally, the scheduled transportation request can include transportation request resource information that is associated with the future request location corresponding to the scheduled transportation request. Indeed, the transportation request resource information can include information such as the number of transportation requests in the proximity of the future request location. Furthermore, the transportation request resource information can also include a the number of transportation requests that are in the proximity of the future request location at the future request time of the scheduled transportation request. In one or more embodiments, the transportation matching system 102 can utilize the transportation provider resource information and the transportation request information to match with transportation providers in accordance with the embodiments described below to match with transportation provider preferences (e.g., preference for non-busy areas) and/or to optimally distribute transportation providers to scheduled transportation requests.

Moreover, in one or more embodiments, the transportation matching system 102 receives (or utilizes) transportation providers with one or more attributes to generate rankings for the transportation providers. Indeed, in some embodiments, the transportation matching system 102 utilizes low engagement transportation providers with attributes associated with the transportation providers to generate rankings for the transportation providers. For example, FIG. 4 illustrates the transportation matching system 102 utilizing low engagement transportation providers 404a-404n (that were identified as low engagement transportation providers in accordance to FIGS. 3A and 3B). In particular, as shown in FIG. 4, the transportation matching system 102 utilizes low engagement transportation providers 404a-404n which include attributes such as a home location, activity patterns, transportation provider preferences, a likelihood of engagement, prior request locations, a likelihood to service requests, and other information of the transportation providers identified to be a reason for low engagement (e.g., information gaps).

In particular, as shown in FIG. 4, the low engagement transportation providers 404a-404n can include a home location. For instance, in one or more embodiments, the transportation matching system 102 receives a mailing address or a physical residential address associated with each transportation provider as the home location. In one or more embodiments, the transportation matching system 102 can utilize the home location associated with each of the transportation providers to determine a distance between the home locations and a request location from a scheduled transportation request. Indeed, the transportation matching system 102 can utilize the home location (or the determined distances) to generate a ranking for each transportation provider in association to the scheduled transportation request. In some embodiments, the transportation matching system 102 solely utilizes home locations to generate ranks for the transportation providers in association to the scheduled transportation request (i.e., regardless of the current location of the transportation provider).

Furthermore, as illustrated in FIG. 4, the low engagement transportation providers 404a-404n can include activity patterns (sometimes referred to as "transportation provider activity patterns") as attributes. More specifically, the transportation matching system 102 can receive the low engagement transportation providers 404a-404n with activity patterns such as, but not limited to, routine active days, routine times of activity, and/or routine active areas. For example, an activity pattern can include information that indicates on which days of a week a transportation provider is more (or frequently) active (i.e., routine active days). Furthermore, an activity pattern can include information that indicates what times of a day a transportation provider is more (or frequently) active (i.e., routine times of activity). Additionally, an activity pattern can include information that indicates in what areas (or regions) a transportation provider is more (or frequently) active (i.e., routine active areas). Indeed, the activity patterns associated with a transportation provider can include a variety of other patterns that are tracked, calculated, determined, and/or submitted for the transportation provider such as, but not limited to, driving statistics, transportation provider ratings (e.g., reviews from requestors and/or the transportation providers for previous transportation requests), and feedback provided by transportation providers for previous transportation requests.

In addition, as shown in FIG. 4, the low engagement transportation providers 404a-404n can include transportation provider preferences as attributes. In particular, the transportation matching system 102 can receive transportation provider preferences such as, but not limited to, requestor group size, pet policies, requestor age, neighborhood preferences, type of destination location, level of activity in a region, and/or value of the transportation requests. For instance, a transportation provider preference can include information that indicates the number of persons (or passengers) a transportation provider allows in the vehicle of the transportation provider. Furthermore, a transportation provider preference can also include whether a transportation provider allows pets within the vehicle. In addition, a transportation provider preference can also include a selected age group for requestors (e.g., a transportation provider selects to not provide service to under-aged requestors).

Moreover, as mentioned above, the transportation matching system 102 can receive a transportation provider preference such as a neighborhood preference and/or a type of destination location. In particular, a transportation provider preference can include information that indicates which neighborhoods a transportation provider wants to service scheduled transportation requests in. Indeed, in one or more embodiments, the transportation matching system 102 receives neighborhood preferences by receiving selected neighborhoods (or regions) where the transportation provider would like to service (or avoid servicing) scheduled transportation requests. Furthermore, the transportation matching system 102 can also receive a transportation provider preference of preferred types of destination locations to service for a transportation provider. Indeed, the transportation matching system 102 can receive information for types of destination locations (e.g., an airport, downtown areas, rural areas, malls, and/or universities) where a transportation provider prefers (or does not prefer) to service scheduled transportation requests. Moreover, the transportation matching system 102 can also receive information for types of future request locations (i.e., pick up locations) similarly to the types of destination locations. Additionally, the transportation matching system 102 can receive information for the level of activity in a region preferred by a transportation provider (e.g., busy areas or non-busy areas).

Furthermore, the transportation matching system 102 can receive a transportation provider preference such as a value of the scheduled transportation request. In particular, in one or more embodiments, the transportation matching system 102 receives information that indicates an estimated compensation range a transportation provider seeks in the scheduled transportation requests. For example, the transportation matching system 102 can receive information indicating that a transportation provider prefers to select scheduled transportation requests that are above a certain monetary amount (e.g., above $30). Indeed, the transportation matching system 102 can receive any variety and/or range of compensation preferences. Furthermore, the transportation matching system 102 can receive any variety and/or combination of transportation provider preferences as attributes for the transportation provider.

Moreover, as illustrated in FIG. 4, the low engagement transportation providers 404a-404n can include a likelihood of engagement as an attribute. In particular, the transportation matching system 102 can utilize historical data associated with activity of a transportation provider to determine a probability of whether the transportation provider will accept the scheduled transportation request. Indeed, in one or more embodiments, the likelihood of engagement attribute can include a percentage that indicates how likely the transportation provider is to accept a scheduled transportation request (such as the scheduled transportation request 402).

Additionally, as shown in FIG. 4, the low engagement transportation providers 404*a*-404*n* can include prior request locations as attributes. In particular, the transportation matching system 102 can utilize prior request locations of a transportation provider as an attribute for the transportation provider. Indeed, the transportation matching system 102 can include prior request locations where the transportation provider successfully serviced and/or prior request locations where the transportation provider has accepted scheduled transportation requests.

Furthermore, as shown in FIG. 4, the low engagement transportation providers 404*a*-404*n* can include a likelihood of servicing the scheduled transportation request as an attribute. More specifically, the transportation matching system 102 can utilize historical data associated with activity of a transportation to determine a probability of whether the transportation provider will completely service the scheduled transportation request. Indeed, in one or more embodiments, the likelihood of servicing the scheduled transportation request attribute can include a percentage that indicates how likely the transportation provider is to successfully complete the scheduled transportation request (such as the scheduled transportation request 402).

Additionally, as mentioned above, the transportation matching system 102 can also receive information associated with transportation providers such as, but not limited to, activity patterns, feedback from the transportation providers and/or requestors of transportation requests serviced in the past, and other information mentioned in FIG. 3 as a reason for low engagement. Indeed, the transportation matching system 102 can utilize this information and the attributes associated with the scheduled transportation request to match transportation providers that have an information gap and/or specific reason for low engagement with scheduled transportation requests that include attributes that assist to bridge or remove the information gap that is causing the low engagement. Furthermore, the transportation matching system 102 can decrease the ranking of a transportation provider when the scheduled transportation includes attributes that are associated with at least one or more reasons for low engagement of the transportation provider.

For example, the transportation matching system 102 can identify that a transportation provider provided poor feedback for transportation requests that involved highway routes and identify this as a reason for low engagement. Moreover, the transportation matching system 102 can rank the transportation provider higher when there is a scheduled transportation request that is does has a local only path (as an attribute). Additional examples include, but are not limited to, the transportation matching system 102 identifying that a low engagement transportation provider indicated that the routes for previous transportation requests were difficult and attributing a higher rank for the transportation provider when a scheduled transportation request includes a less difficult navigation route and identifying that a low engagement transportation provider indicated a bad experience with night time transportation request and attributing a higher rank for the transportation provider when a scheduled transportation request are during the day time. Indeed, the transportation matching system 102 can utilize any information corresponding to the transportation provider to identify such information gaps and utilize these information gaps to rank and/or match with attributes of scheduled transportation requests.

As such, although FIG. 4 illustrates the transportation matching system 102 utilizing specific attributes associated with the transportation providers, the transportation matching system 102 can utilize a variety of other attributes associated with the transportation providers. For example, the transportation matching system 102 can utilize attributes such as, but not limited to, the engagement level (in accordance with FIGS. 3A-3B), other accepted scheduled transportation requests by the transportation provider, predicted future locations of the transportation provider (i.e., based on accepted scheduled transportation requests or other data), transportation provider experience level (e.g., the age of the transportation provider's account on the transportation matching system 102), and/or weather preferences. Additionally, the transportation matching system 102 can utilize information associated with transportation providers as mentioned in FIGS. 3A and 3B as attributes for ranking transportation providers. Likewise, the transportation matching system 102 can utilize attributes associated with the transportation providers, as mentioned in FIG. 4, to generate an engagement level in accordance with the description of FIGS. 3A and 3B. Furthermore, the transportation matching system 102 can utilize any combination of attributes associated with the transportation providers to generate rankings for the transportation providers.

Additionally, the transportation matching system 102 can provide a scheduled transportation request (with the associated attributes) and transportation providers (with the associated attributes) to a ranking generator. For example, FIG. 4 illustrates the transportation matching system 102 providing the scheduled transportation request 402 and the low engagement transportation providers 404*a*-404*n* to a ranking generator 406 to generate rankings for the transportation providers in relation to the scheduled transportation request 402.

For example, the transportation matching system 102 can utilize a ranking generator to analyze information (or attributes) associated with the transportation providers and the scheduled transportation request to generate rankings for the transportation providers. In particular, FIG. 4 illustrates the transportation matching system 102 utilizing the ranking generator 406 to analyze attributes associated with the scheduled transportation request 402 and the attributes associated with the low engagement transportation providers 404*a*-404*n*. Furthermore, the ranking generator 406 can utilize a scoring algorithm, a neural network, and/or other ranking methods to generate rankings for the low engagement transportation providers 404*a*-404*n* for the scheduled transportation request 402.

As just mentioned, the transportation matching system 102 can utilize a ranking generator that analyzes attributes associated with the transportation providers and the scheduled transportation requests with a scoring algorithm. In particular, the ranking generator can generate a score for each transportation provider based on an analysis of the associated attributes of the transportation providers and the scheduled transportation request. For instance, in one or more embodiments, the ranking generator can assign weights and/or scores to each attribute associated with the transportation providers and the scheduled transportation request. For example, the ranking generator can assign a higher score to a transportation provider with a home location that is closer to the request location of the scheduled transportation request. Moreover, the transportation matching system 102 can utilize the offline status of a transportation provider to weight the score and/or ranking of the transportation provider (e.g., the ranking is weighted to rank offline transportation providers more highly than online transportation providers). Indeed, the transportation matching system 102 can utilize the ranking generator to generate scores for each transportation provider and determine a ranking based on the generated scores.

Additionally, in one or more embodiments, the transportation matching system 102 utilizes a ranking generator that analyzes attributes associated with the transportation providers and the scheduled transportation requests with a neural network that is trained to generate rankings for the transportation providers. For instance, the transportation matching system 102 can utilize a neural network that analyzes and scores a variety of types of attributes (as described above) associated with a transportation provider and a scheduled transportation request. Additionally, after analyzing the information, the transportation matching system 102 can further utilize the neural network to generate (or predict) rankings for the transportation providers.

For example, in one or more embodiments, the transportation matching system 102 can input one or more attributes associated with the transportation providers and the attributes associated with the scheduled transportation request into a neural network. Furthermore, the neural network can generate the rankings for transportation providers by analyzing the attributes associated with the transportation providers and/or the scheduled transportation request. In some embodiments, the neural network can generate scores that indicate a likelihood that the transportation provider will successfully complete the scheduled transportation request for the transportation providers based on the attributes. Moreover, the transportation matching system 102 can utilize the generated scores to rank the transportation providers for the scheduled transportation request.

Moreover, the transportation matching system 102 can utilize the ranking generator to generate rankings based on various combinations of attributes associated with the transportation providers and the scheduled transportation request. For example, in one or more embodiments, the transportation matching system 102 utilizes the ranking generator to compare and analyze attributes associated with each transportation provider to generate rankings for the transportation providers. In particular, the transportation matching system 102 can compare attributes associated with each transportation provider to other transportation providers and to the scheduled transportation request to determine rankings that are relative to the transportation providers (e.g., a non-individual determination of a ranking for each transportation provider). Furthermore, although FIG. 4 illustrates the ranking generator 406 generating rankings for low engagement transportation providers 404a-404n, the transportation matching system 102 can generate rankings for all of the transportation providers from the subset of low engagement transportation providers 114 in FIG. 1.

Furthermore, the transportation matching system 102 can utilize a ranking generator to determine a ranking for transportation providers in terms of which transportation provider is best matched to a scheduled transportation request. Indeed, a ranking generator can provide a ranked list of the low engaged transportation providers that is ordered from the most optimal match for the scheduled transportation request to the least optimal match for the scheduled transportation request (or vice versa).

For instance, FIG. 4 illustrates the transportation matching system 102 utilizing the ranking generator 406 to generate a dataset of low engagement transportation provider ranks 408 for the scheduled transportation request 402 from the low engagement transportation providers 404a-404n. As shown in FIG. 4, the dataset of low engagement transportation provider ranks 408 provides a list of the most optimal transportation provider match with the scheduled transportation request 402 (as "1") to the least optimal transportation provider (from the low engagement transportation providers 404a-404n). In addition, the generated ranking list can include a list of all analyzed transportation providers by the ranking generator. Moreover, the ranking generator can generate rankings in other formats such as, but not limited to, numerical scores, letter grades, percentages, and/or by providing a single transportation provider that is the optimal match for the scheduled transportation request.

Figure 5:
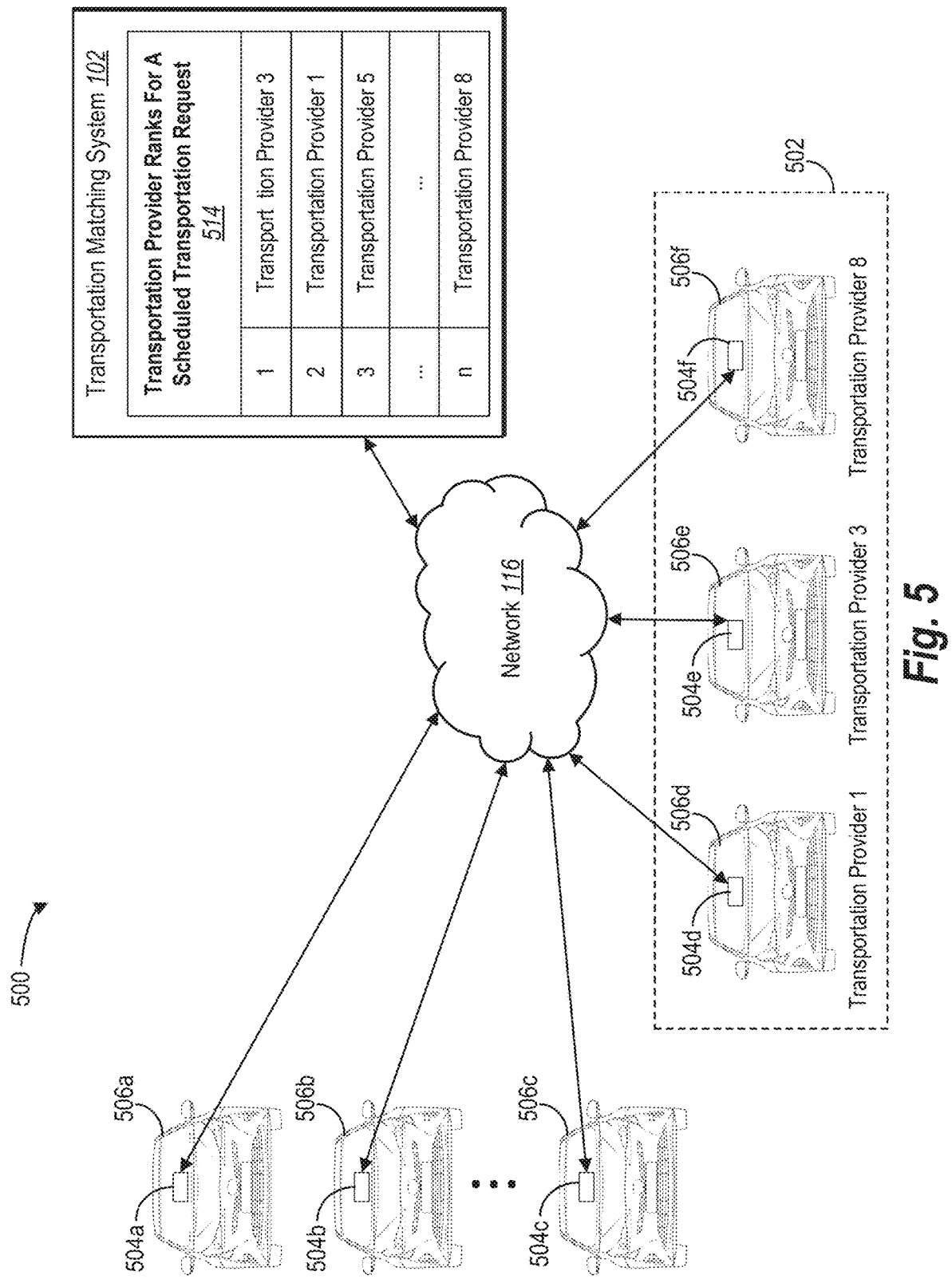
FIG. 5 illustrates a diagram of an environment in which a transportation matching system provides a scheduled transportation request to a selected transportation provider based on generated rankings in accordance with one or more embodiments.

As mentioned above, the transportation matching system 102 can provide a scheduled transportation request to a selected transportation provider (based on the generated rankings). For example, FIG. 5 illustrates an exemplary environment 500 in which the transportation matching system 102 provides a scheduled transportation request, with temporary exclusive access, to a transportation provider after selecting the transportation provider from a dataset of transportation providers with generated rankings. Indeed, as shown in FIG. 5, the exemplary environment 500 includes the transportation matching system 102 with a dataset of ranked low engagement transportation providers 514 (for a scheduled transportation request). Furthermore, as shown in FIG. 5, the exemplary environment 500 includes transportation providers 506a-506f for the transportation matching system 102 and a subset of low engagement transportation providers 502 that are identified as low engagement transportation providers. In addition, the exemplary environment 500 also includes the network 116 from which the transportation providers 506a-506f (utilizing transportation provider computing devices 504a-504f) communicate with the transportation matching system 102.

In particular, the transportation matching system 102 can select a transportation provider for a scheduled transportation request from a dataset of low engagement transportation providers. For example, FIG. 5 illustrates the exemplary environment 500 with a transportation matching system 102 having a dataset of ranked low engagement transportation providers 514. Indeed, the dataset of ranked low engagement transportation provider 514 can be generated as discussed in FIG. 4 above. Furthermore, the transportation matching system 102 can select a transportation provider from the dataset of ranked low engagement transportation providers 514 to service the scheduled transportation request (i.e., the scheduled transportation request that corresponds to the generated rankings). For instance, the transportation matching system 102 can select "transportation provider 3" to service the scheduled transportation request because "transportation provider 3" is the highest ranked transportation provider.

Moreover, the transportation matching system 102 can provide the scheduled transportation request to a low engagement transportation provider. For example, as shown in FIG. 5, the transportation matching system 102 can provide the scheduled transportation request to "transportation provider 3," which belongs to the subset of low engagement transportation providers 502. In one or more embodiments, the transportation matching system 102 sends a notification to a transportation provider computing device of a selected transportation provider based on the generated rankings. Indeed, referring to FIG. 5, the transportation matching system 110 can send a notification (with information for the scheduled transportation request) to the transportation provider computing device 504e belonging to "transportation provider 3" 506e. As mentioned above, the transportation matching system 102 matches and provides the scheduled transportation request to the selected transportation provider regardless of whether the transportation provider is online or offline. Furthermore, the transportation matching system 102 can provide exclusive access to "transportation provider 3" 506e for the scheduled transportation request. In some embodiments, the transportation matching system 102 also enables accessibility to the scheduled transportation request within a scheduled transportation portal.

Furthermore, the transportation matching system 102 can receive a response from the selected transportation provider after selecting a transportation provider and sending the scheduled transportation request to the selected transportation provider. For example, the transportation matching system 102 can receive an acceptance for the scheduled transportation request or a refusal for the scheduled transportation request from a transportation provider computing device. Furthermore, the transportation matching system 102 can also receive no action for the scheduled transportation request from the transportation provider computing device. Additionally, the transportation matching system 102 can perform various actions depending on the received action from a transportation provider computing device.

For instance, upon receiving a refusal for the scheduled transportation request from a transportation provider, the transportation matching system 102 can provide the scheduled transportation request to another low engagement transportation provider based on the ranking and/or to the set of all transportation providers. Indeed, in one or more embodiments, the transportation matching system 102 can select the next highest ranking transportation provider (from a dataset of generated rankings in accordance with FIG. 4) for the scheduled transportation request. For example, referring to FIG. 5, the transportation matching system 102 can provide exclusive access to the scheduled transportation request to the transportation provider computing device 504d of "transportation provider 1" 506d after the transportation provider computing device 504e of "transportation provider 3" 506d refuses the scheduled transportation request. Furthermore, the transportation matching system 102 can continue to provide the scheduled transportation request to low engagement transportation providers with generated rankings, based on the rankings, until one transportation provider accepts the scheduled transportation request.

Moreover, in some embodiments, the transportation matching system 102 provides access to the scheduled transportation request to all transportation providers after a threshold amount of time and/or if a low engagement transportation provider match cannot be found for the scheduled transportation request. For example, the transportation matching system 102 can provide access to the scheduled transportation request to all transportation providers 506a-506f after one or more selected low engagement transportation providers do not respond to the scheduled transportation request in a threshold amount of time. Indeed, the threshold amount of time can be determined by the transportation matching system 102. Furthermore, the transportation matching system 102 can provide access to the scheduled transportation request to all transportation providers when the time associated with the scheduled transportation request is approaching the current time (e.g., the time is within 30 minutes). Furthermore, the transportation matching system 102 can provide access to the scheduled transportation request to all of the transportation providers when a selected scheduled transportation request is cancelled by the selecting transportation provider.

Additionally, the transportation matching system 102 can repeat the above mentioned process with more than one scheduled transportation request. For example, the transportation matching system 102 can continually generate rankings for transportation providers for other scheduled transportation requests. Indeed, in one or more embodiments, the transportation matching system 102 provides multiple scheduled transportation requests to a selected transportation provider to create linked scheduled transportation requests for the selected transportation provider. Indeed, in some embodiments, the transportation matching system 102 organizes a day (or any other time frame) for a transportation provider with optimized transportation requests that are selected for the transportation provider. As mentioned above, although FIG. 5 shows a limited number of transportation providers and transportation provider computing devices, the transportation matching system 102 can include any number of transportation providers and transportation provider computing devices. Similarly, the transportation matching system 102 can include any number of transportation providers and transportation provider computing devices in the subset of low engagement transportation providers 502.

As mentioned above, the transportation matching system 102 can, exclusively, provide a scheduled transportation request to a selected transportation provider on a scheduled transportation portal. For example, FIGS. 6A-6E illustrate the transportation matching system 102 providing a scheduled transportation request to a selected transportation provider on a scheduled transportation portal through a transportation provider computing device. For instance, FIGS. 6A-6E include a graphical user interface ("GUI") of a notification for the scheduled transportation request, a GUI of a console card notification within a mobile-app for the scheduled transportation request, a GUI of a scheduled transportation portal, a GUI for the details of the scheduled transportation request, and a GUI for acceptance of the scheduled transportation request by a transportation provider.

Indeed, as mentioned above, by generating an optimal match for the low engagement transportation providers and the scheduled transportation request in accordance with FIGS. 3-5 and providing the matched scheduled transportation request in the GUI of FIG. 6, the transportation matching system 102 can reduce the disconnect of information between the transportation matching system 102 and low engagement transportation providers. In particular, the low engagement transportation providers can be efficiently engaged by the transportation matching system 102 with less computational resources. For example, as a result of providing the matched scheduled transportation request to the transportation provider with exclusive access and with information that enables the transportation provider to service scheduled transportation requests with a higher rate of success (as discussed above) with less computation resources.

Figure 6B:
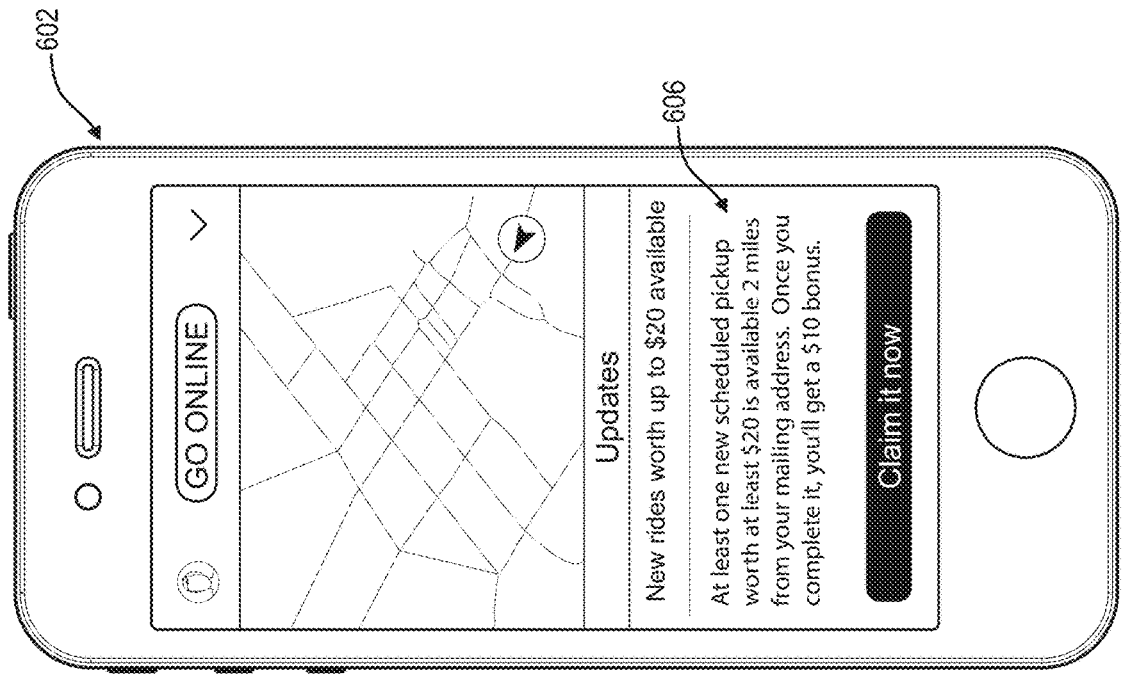
FIGS. 6A-6E illustrate exemplary graphical user interfaces in accordance with one or more embodiments.
Figure 6A:
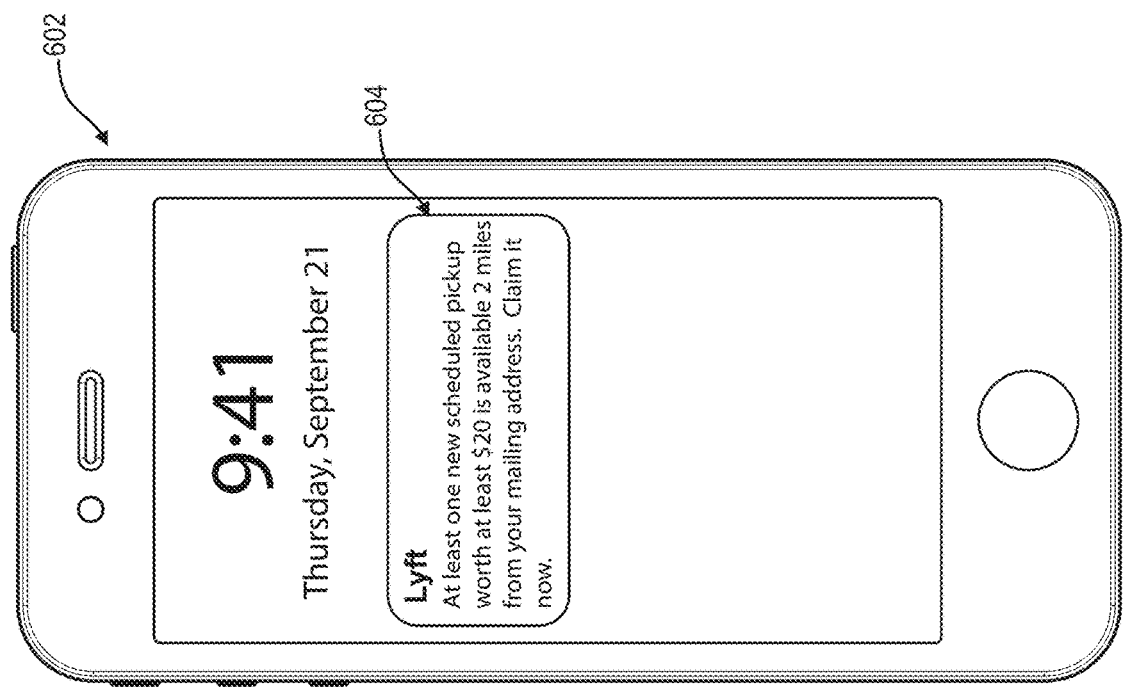

As shown in FIG. 6A, the transportation matching system 102 can provide a notification 604 to a transportation provider computing device 602 when the transportation matching system 102 based mobile-app is not active (e.g., the transportation provider is offline and/or signed out of the transportation matching system 102 based mobile-app). For example, the transportation matching system 102, after selecting a transportation provider for a scheduled transportation request, can provide information to the selected transportation provider via a notification that presents information for the scheduled transportation request (e.g., an estimated value and a distance from the home location of the transportation provider). Indeed, the transportation matching system 102 can provide the notification to the transportation provider computing device 602 in order to notify the transportation provider of the scheduled transportation request specifically when the transportation provider is offline and/ or signed out of the transportation matching system 102 based mobile-app (i.e., to increase the likelihood that the transportation provider will engage and service the scheduled transportation request). In one or more embodiments, the transportation matching system 102 provides the notification with a deep-link (e.g., a URL) that directs a user to the scheduled transportation request detail view (as described in FIG. 6D) upon interaction with the notification. In some embodiments, the transportation matching system 102 provides multiple notifications to the transportation provider when a scheduled transportation request is above a threshold estimated value. Furthermore, in one or more embodiments, the transportation matching system 102 can cause the removal of the notification from a transportation provider computing device if, as described in FIG. 5, the scheduled transportation request is made exclusively available to another (or next) transportation provider.

Figure 6D:
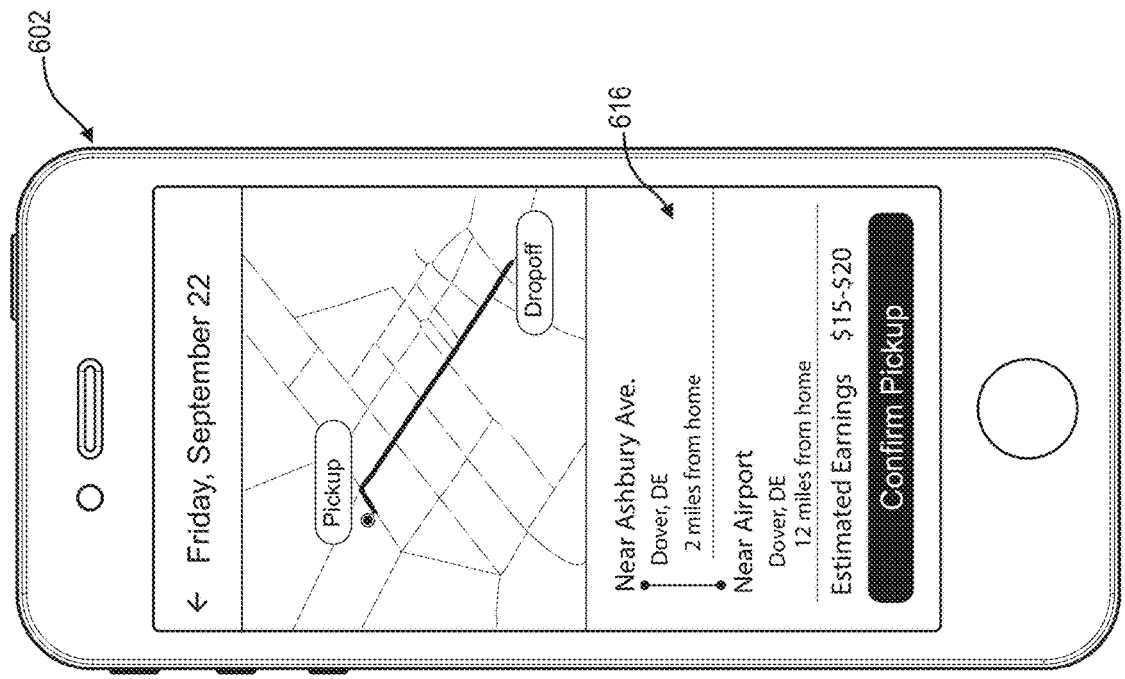

In addition, as shown in FIG. 6B, the transportation matching system 102 can provide a console card notification 606 for the scheduled transportation request within a mobile-app on the transportation provider computing device 602 when the transportation matching system 102 based mobile-app is active. Indeed, as mentioned in FIG. 6A, the console card notification can provide information for the scheduled transportation request and a deep-link to the scheduled transportation request detail view (as shown in FIG. 6D) upon interaction with the console card notification. In addition, in one or more embodiments, the transportation matching system 102 can cause the removal of the console card notification from a transportation provider computing device if, as described in FIG. 5, the scheduled transportation request is made exclusively available to another (or next) transportation provider.

Figure 6C:
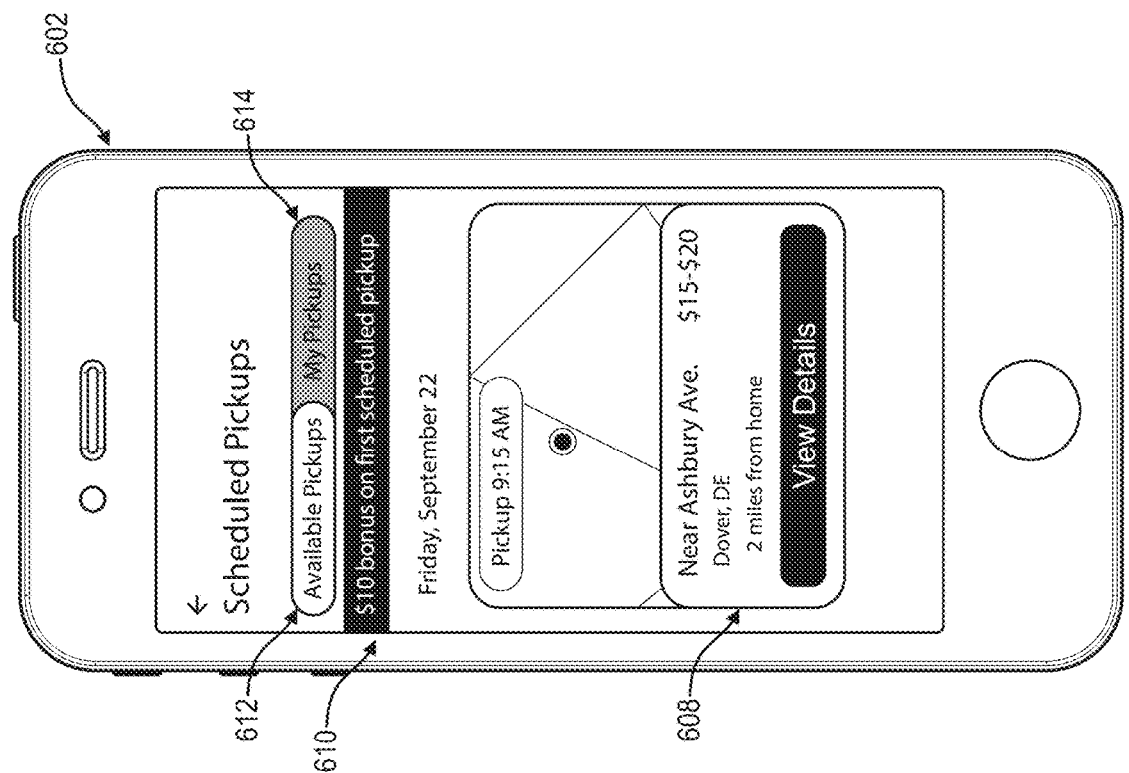

Moreover, FIG. 6C illustrates an exemplary GUI of the scheduled transportation portal for the transportation matching system 102 on the transportation provider computing device 602. For example, as shown in FIG. 6C, the transportation matching system 102 can provide a GUI of the scheduled transportation portal that includes available scheduled transportation requests 612 (i.e., available pickups) and scheduled transportation requests that are already accepted by the transportation provider (i.e., my pickups) 614. Indeed, the transportation matching system 102 can provide and display one or more scheduled transportation requests 608 on the transportation provider computing device 602 as they are available to the corresponding transportation provider.

Furthermore, as described above, the transportation matching system 102 can provide scheduled transportation requests exclusively to a selected transportation provider. Indeed, referring to FIG. 6C, in one or more embodiments, the transportation matching system 102 provides the scheduled transportation request 608 exclusively to the selected transportation provider corresponding to transportation provider computing device 602. Indeed, the transportation matching system 102 can prevent accessibility to the scheduled transportation request 608 from other transportation provider computing devices when it is exclusive to a selected transportation provider (i.e., priority access to the selected transportation provider). In some embodiments, the transportation matching system 102 displays a timer to indicate the amount of time before the scheduled transportation request becomes accessible to other transportation providers on the scheduled transportation portal.

As described above, the transportation matching system 102 can provide access to the scheduled transportation request to other selected transportation providers and/or to more than one transportation provider. Indeed, after a first threshold amount of time (e.g., a time determined for exclusive access) expires and/or refusal by the first selected transportation provider, the transportation matching system 102 can provide exclusive access to the scheduled transportation request to a second transportation provider that is selected from a ranked list of transportation providers. Furthermore, the transportation matching system 102 can similarly provide the second transportation provider with access for a second threshold amount of time before providing access to one or more transportation providers (e.g., a third transportation provider) on the scheduled transportation portal.

Furthermore, as described above, the transportation matching system 102 can provide access to the scheduled transportation request to all of the transportation providers on the transportation matching system 102. Indeed, referring to FIG. 6C, the transportation matching system 102 can provide access to the scheduled transportation request 608 under the available pickups section 612 of the scheduled transportation portal to all of the transportation providers. Furthermore, the transportation matching system 102 can assign the scheduled transportation request 608 to the first transportation provider to claim the scheduled transportation request 608. Furthermore, the transportation matching system 102 can remove accessibility to the scheduled transportation request 608 after a transportation provider claims the request.

Moreover, in one or more embodiments, the transportation matching system 102 can provide other messages related to the scheduled transportation portal and/or to a specific scheduled transportation request. For example, as shown in FIG. 6C, the transportation matching system 102 provides a message 610 to indicate that the transportation provider will earn a bonus upon completion of a scheduled transportation request (e.g., completion of a first scheduled pickup). Indeed, the message 610 can include various information related to the scheduled transportation portal, such as, but not limited to, the time for the next scheduled transportation request assigned to the transportation provider).

Additionally, the transportation matching system 102 can provide details for the scheduled transportation request on a transportation provider computing device. For example, as shown in FIG. 6D and referring to FIG. 6C, the transportation matching system 102 can display scheduled transportation request details 616 upon selection of the scheduled transportation request 608 on the transportation provider computing device 602. As shown in FIG. 6D, the scheduled transportation request details 616 can include distances from home for the transportation provider and an estimated value of the scheduled transportation request (e.g., an estimated earnings). Indeed, by providing a transportation provider with detailed information on a scheduled transportation request that is optimally matched, the transportation provider is more likely to service the transportation request and prevent an inefficient utilization of computational resources by having to re-match the scheduled transportation request multiple times.

Figure 6E:
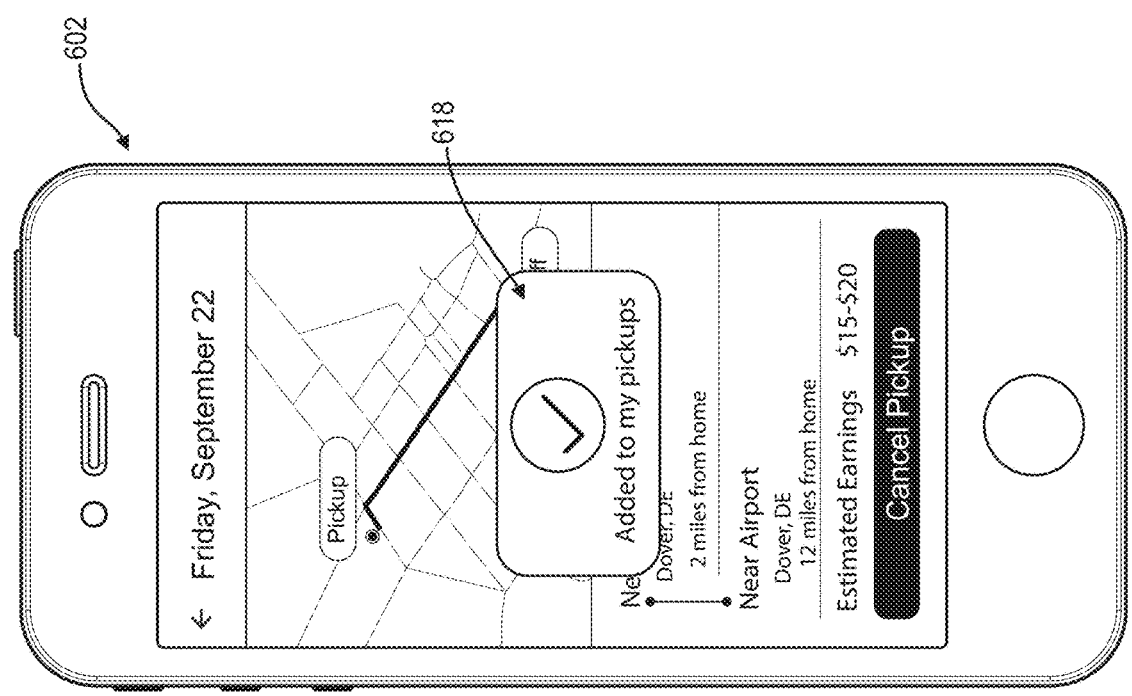

Furthermore, the transportation matching system 102 can provide confirmation for the scheduled transportation request when a selection of the scheduled transportation request is received from a transportation provider computing device. For example, FIG. 6E illustrates the transportation provider computing device 602 with a confirmation message 618 that indicates that the scheduled transportation request is added to the transportation provider assignments (e.g., to the "my pickups" section of the scheduled transportation portal).

As described above, the transportation matching system 102 can efficiently improve the accuracy of transportation provider matches with scheduled transportation requests to increase active transportation providers (e.g., activate low engagement transportation providers) compared to conventional systems. Indeed, as mentioned above, the transportation matching system 102 can provide a cost effective and computation resource cost effective mechanism to reactivate inactive or infrequently active transportation providers. Researchers performed experiments using the transportation matching system 102 to establish this improved accuracy. For the experiments, the researches configured the transportation matching system 102 to provide exclusive (e.g., priority access) of scheduled transportation requests to low engagement transportation providers for 10 minutes prior to making the scheduled transportation request accessible to all of the transportation providers. Indeed, the experiments with the transportation matching system 102 resulted in a 12 percent increase in reactivation of low engagement transportation providers and a 10 percent increase in transportation provider hours for the transportation providers. Indeed, the transportation matching system 102 indicates an improvement in accuracy and the engagement of active transportation providers without inefficient utilization of computational resources compared to conventional systems.

Figure 7:
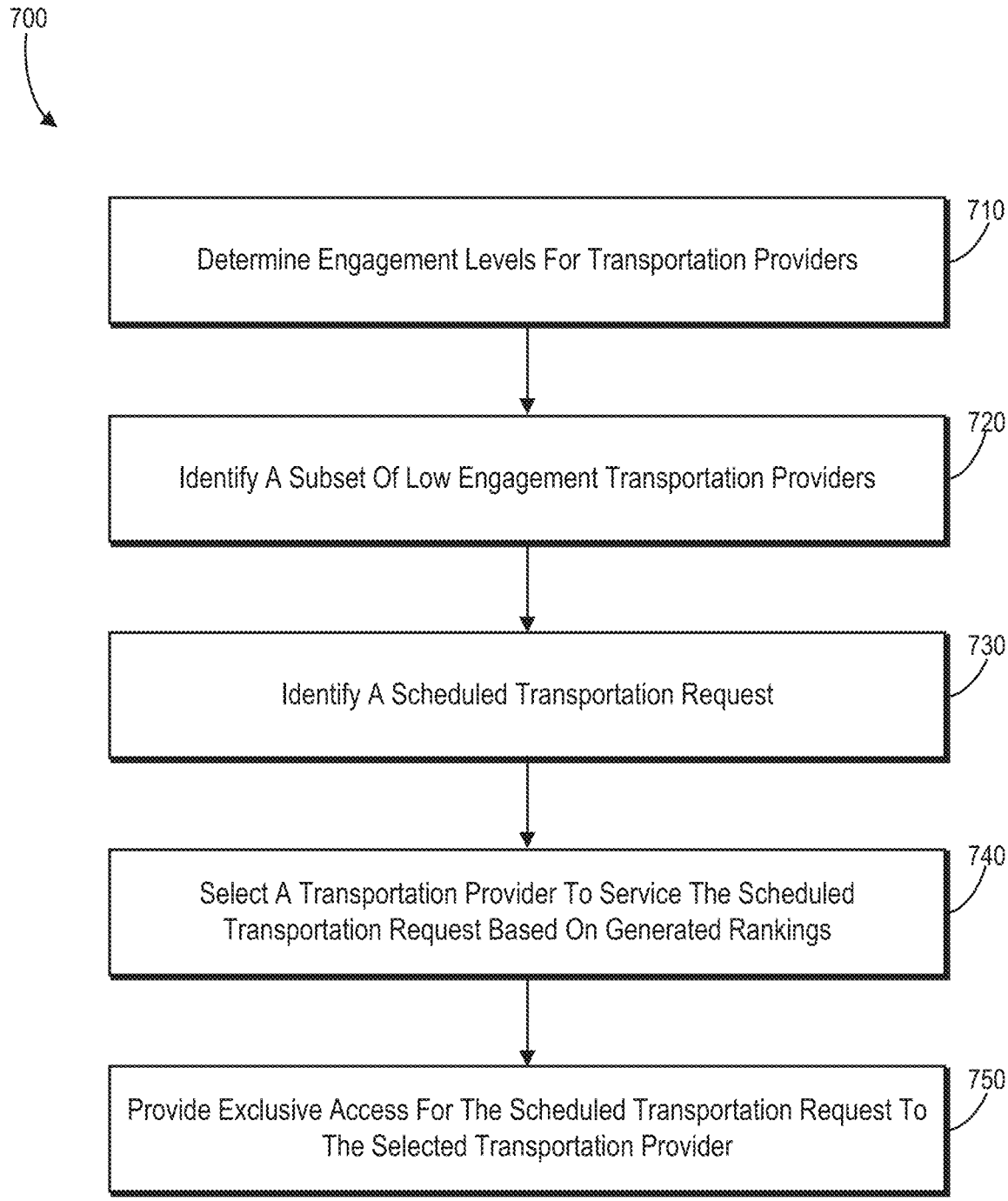
FIG. 7 illustrates a flowchart of a series of acts in accordance with one or more embodiments.

FIGS. 1-6, the corresponding text, and the examples provide a number of different methods, systems, devices, and non-transitory computer-readable media of the transportation matching system 102. In addition to the foregoing, one or more embodiments can also be described in terms of flowcharts comprising acts for accomplishing a particular result, as shown in FIG. 7. FIG. 7 may be performed with more or fewer acts. Further, the acts may be performed in differing orders. Additionally, the acts described herein may be repeated or performed in parallel with one another or parallel with different instances of the same or similar acts.

As mentioned, FIG. 7 illustrates a flowchart of a series of acts 700 for generating a match between a scheduled transportation request and a low engagement transportation provider in accordance with one or more embodiments. While FIG. 7 illustrates acts according to one embodiment, alternative embodiments may omit, add to, reorder, and/or modify any of the acts shown in FIG. 7. The acts of FIG. 7 can be performed as part of a method. Alternatively, a non-transitory computer-readable storage medium can comprise instructions that, when executed by one or more processors, cause a computing device to perform the acts of FIG. 7. In some embodiments, a system can perform the acts of FIG. 7.

As illustrated in FIG. 7, the series of acts 700 includes an act 710 of determining engagement levels for transportation providers. In particular, the act 710 can include analyzing information associated with a plurality of transportation providers to determine an engagement level for each transportation provider from the plurality of transportation providers. In addition, the information associated with the set of transportation providers to determine the engagement level can comprise a log of transportation requests completed by the transportation provider, a log of when the transportation provider was online with the transportation matching system, and a log of interactions with a mobile application associated with the transportation matching system. Moreover, the plurality of transportation providers can comprise offline transportation providers.

Furthermore, as illustrated in FIG. 7, the series of acts 700 includes an act 720 of identifying a subset of low engagement transportation providers. In particular, the act 720 can include identifying, from the plurality of transportation providers, a subset of low engagement transportation providers by comparing the engagement level for each transportation provider to a predetermined engagement threshold. Additionally, the engagement threshold can include at least one of a threshold time periods of inactivity, a threshold number of completed transportation requests, or a threshold frequency of completed transportation requests. Furthermore, the act 720 can include identifying the subset of low engagement transportation providers each having the engagement level below the engagement threshold by determining, for each transportation provider, that a frequency of servicing transportation requests is less than a threshold frequency of servicing transportation requests, that a total time of servicing transportation requests is less than a threshold total time of servicing transportation requests, that a number of serviced transportation requests is less than a threshold number of serviced transportation requests, or an amount of time since the transportation provider's last serviced transportation request is greater than a threshold amount of time. Additionally, the engagement level can be weighted for offline transportation providers. Additionally, the act 720 can include analyzing information associated with past activity of the subset of low engagement transportation providers to identify one or more reasons for low engagement for each of the subset of low engagement transportation providers.

As illustrated in FIG. 7, the series of acts 700 also includes an act 730 of identifying a scheduled transportation request. In particular, the act 730 can include identifying a scheduled transportation request specifying a future request time and a future request location. Furthermore, the attributes associated with the scheduled transportation request comprise the future request time, the future request location, a type of the future request location, a destination location, a type of the destination location, a value of the scheduled transportation request, and one or more requestor preferences.

Moreover, as illustrated in FIG. 7, the series of acts 700 also includes an act 740 of selecting a transportation provider to service the scheduled transportation request based on generated rankings. In particular, the act 740 can include selecting a transportation provider to service the scheduled transportation request by generating a ranking of the subset of low engagement transportation providers based on attributes associated with the subset of low engagement transportation providers and attributes associated with the scheduled transportation request and selecting the transportation provider to service the scheduled transportation request based on the generated ranking. Additionally, the attributes associated with the subset of low engagement transportation providers can comprise a home location, prior request locations, transportation provider preferences, transportation provider activity patterns, a likelihood of servicing the scheduled transportation request, ratings for previous transportation requests, feedback provided by transportation providers for previous transportation requests, and a likelihood of engagement. Moreover, the attributes associated with the transportation providers can comprise information corresponding to reasons for low engagement by the transportation providers. For example, the act 740 can include generating the ranking based at least on the identified one or more reasons for low engagement for each of the subset of low engagement transportation providers to decrease a ranking of a transportation provider if the scheduled transportation request is associated with at least one of the one or more reasons for low engagement of the transportation provider. Moreover, the plurality of transportation providers can comprise offline transportation providers and the ranking can be weighted to rank offline transportation providers more highly than online transportation providers.

Furthermore, the act 740 can also include generating the ranking of the subset of low engagement transportation providers by utilizing a neural network to analyze the attributes associated with the subset of low engagement transportation providers and the attributes associated with the scheduled transportation request. In particular, the act 740 can include inputting the attributes associated with the subset of low engagement transportation providers and the attributes associated with the scheduled transportation request into a neural network. Furthermore, the act 740 can include receiving a score from the neural network for each transportation provider from the subset of low engagement transportation providers, the score indicating a likelihood that the transportation provider will complete the scheduled transportation request. Moreover, the act 740 can include generating the ranking of the subset of low engagement transportation providers based on the scores for each of the subset of low engagement transportation providers. Additionally, the act 740 can include receiving a generated ranking of the subset of low engagement transportation providers from the neural network and selecting the transportation provider to service the scheduled transportation request based on the generated ranking.

As illustrated in FIG. 7, the series of acts 700 also includes an act 750 of providing exclusive access for the scheduled transportation request to the selected transportation provider. In some embodiments, the act 750 can include providing exclusive access for the scheduled transportation request to the selected transportation provider within a scheduled transportation portal accessible by the set of transportation providers for selecting scheduled transportation requests. Furthermore, the act 750 can also include providing exclusive access for the scheduled transportation request to the selected transportation provider for a first period of time. Additionally, the act 750 can include, after an expiration of a first period of time without the selected transportation provider claiming the scheduled transportation request, providing based on the generated ranking exclusive access for the scheduled transportation request to a second transportation provider from the subset of low engagement transportation providers. Moreover, the act 750 can also include, after an expiration of a first period of time without the selected transportation provider claiming the scheduled transportation request, open access for the scheduled transportation request to the plurality of transportation providers. Moreover, the act 750 can include, after an expiration of the second period of time without the second transportation provider claiming the scheduled transportation request, providing open access for the scheduled transportation request to the plurality of transportation providers within a scheduled transportation portal for selecting scheduled transportation requests. Additionally, the act 750 can include providing a notification associated with the scheduled transportation request to a transportation provider computing device associated with the selected transportation provider. Additionally, the act 750 can include providing the notification associated with the scheduled transportation request to the transportation provider computing device associated with the selected transportation provider when the transportation provider is offline.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 8:
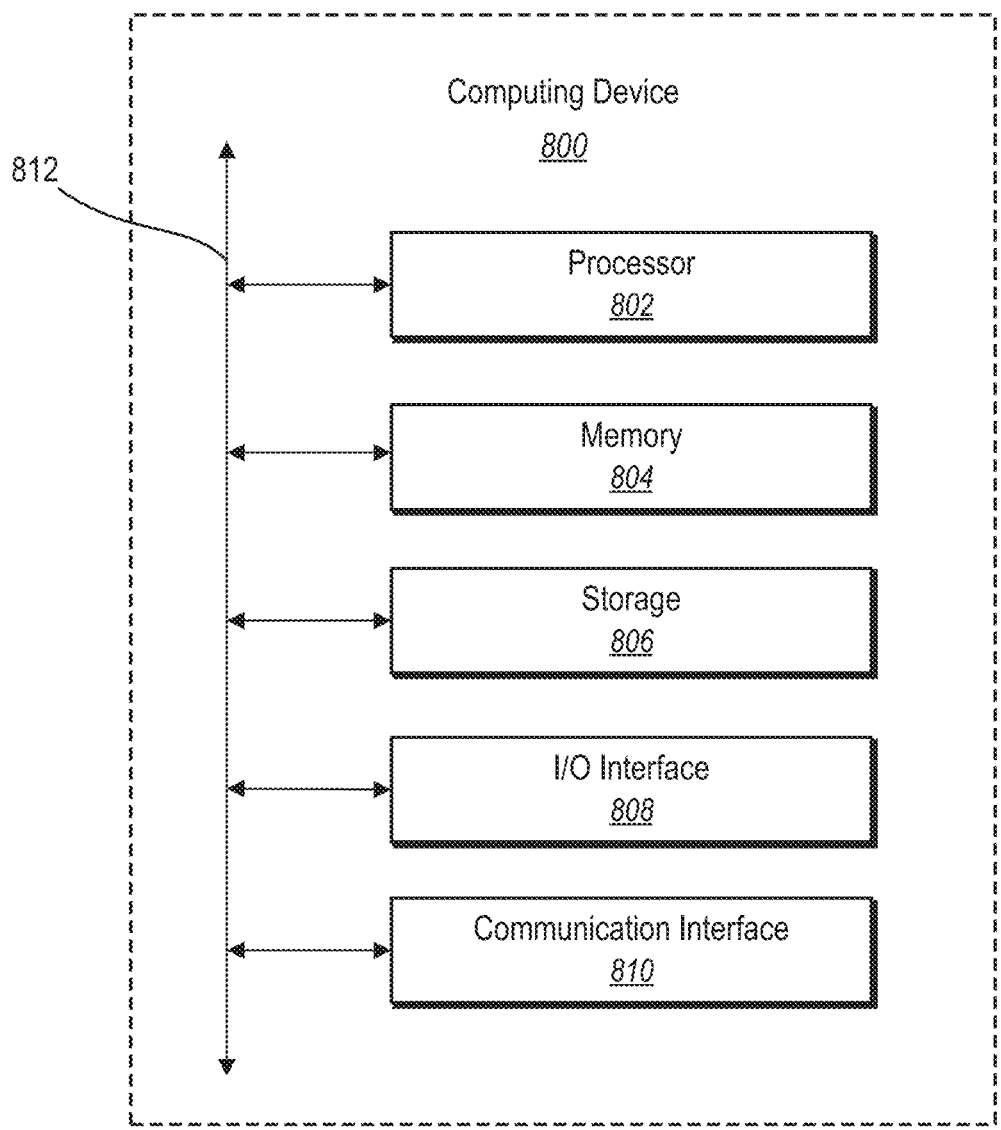
FIG. 8 illustrates a block diagram of an exemplary computing device in accordance with one or more embodiments.

FIG. 8 illustrates a block diagram of an example computing device 800 that may be configured to perform one or more of the processes described above. One will appreciate that one or more computing devices, such as the computing device 800 may represent the computing devices described above (e.g., requestor computing device 106, server 104, and transportation provider computing devices 110a-110n, 116a-116n, 504a-504n, and 512a-512n). In one or more embodiments, the computing device 800 may be a mobile device (e.g., a mobile telephone, a smartphone, a PDA, a tablet, a laptop, a camera, a tracker, a watch, a wearable device, etc.). In some embodiments, the computing device 800 may be a non-mobile device (e.g., a desktop computer or another type of client device). Further, the computing device 800 may be a server device that includes cloud-based processing and storage capabilities.

As shown in FIG. 8, the computing device 800 can include one or more processor(s) 802, memory 804, a storage device 806, input/output interfaces 808 (or "I/O interfaces 808"), and a communication interface 810, which may be communicatively coupled by way of a communication infrastructure (e.g., bus 812). While the computing device 800 is shown in FIG. 8, the components illustrated in FIG. 8 are not intended to be limiting. Additional or alternative components may be used in other embodiments. Furthermore, in certain embodiments, the computing device 800 includes fewer components than those shown in FIG. 8. Components of the computing device 800 shown in FIG. 8 will now be described in additional detail.

In particular embodiments, the processor(s) 802 includes hardware for executing instructions, such as those making up a computer program. As an example, and not by way of limitation, to execute instructions, the processor(s) 802 may retrieve (or fetch) the instructions from an internal register, an internal cache, memory 804, or a storage device 806 and decode and execute them.

The computing device 800 includes memory 804, which is coupled to the processor(s) 802. The memory 804 may be used for storing data, metadata, and programs for execution by the processor(s). The memory 804 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 804 may be internal or distributed memory.

The computing device 800 includes a storage device 806 includes storage for storing data or instructions. As an example, and not by way of limitation, the storage device 806 can include a non-transitory storage medium described above. The storage device 806 may include a hard disk drive (HDD), flash memory, a Universal Serial Bus (USB) drive or a combination these or other storage devices.

As shown, the computing device 800 includes one or more I/O interfaces 808, which are provided to allow a user to provide input to (such as user strokes), receive output from, and otherwise transfer data to and from the computing device 800. These I/O interfaces 808 may include a mouse, keypad or a keyboard, a touch screen, camera, optical scanner, network interface, modem, other known I/O devices or a combination of such I/O interfaces 808. The touch screen may be activated with a stylus or a finger.

The I/O interfaces 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 808 are configured to provide graphical data to a display for presentation to a user. The graphical data may be representative of one or more graphical user interfaces and/or any other graphical content as may serve a particular implementation.

The computing device 800 can further include a communication interface 810. The communication interface 810 can include hardware, software, or both. The communication interface 810 provides one or more interfaces for communication (such as, for example, packet-based communication) between the computing device and one or more other computing devices or one or more networks. As an example, and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI. The computing device 800 can further include a bus 812. The bus 812 can include hardware, software, or both that connects components of computing device 800 to each other.

Figure 9:
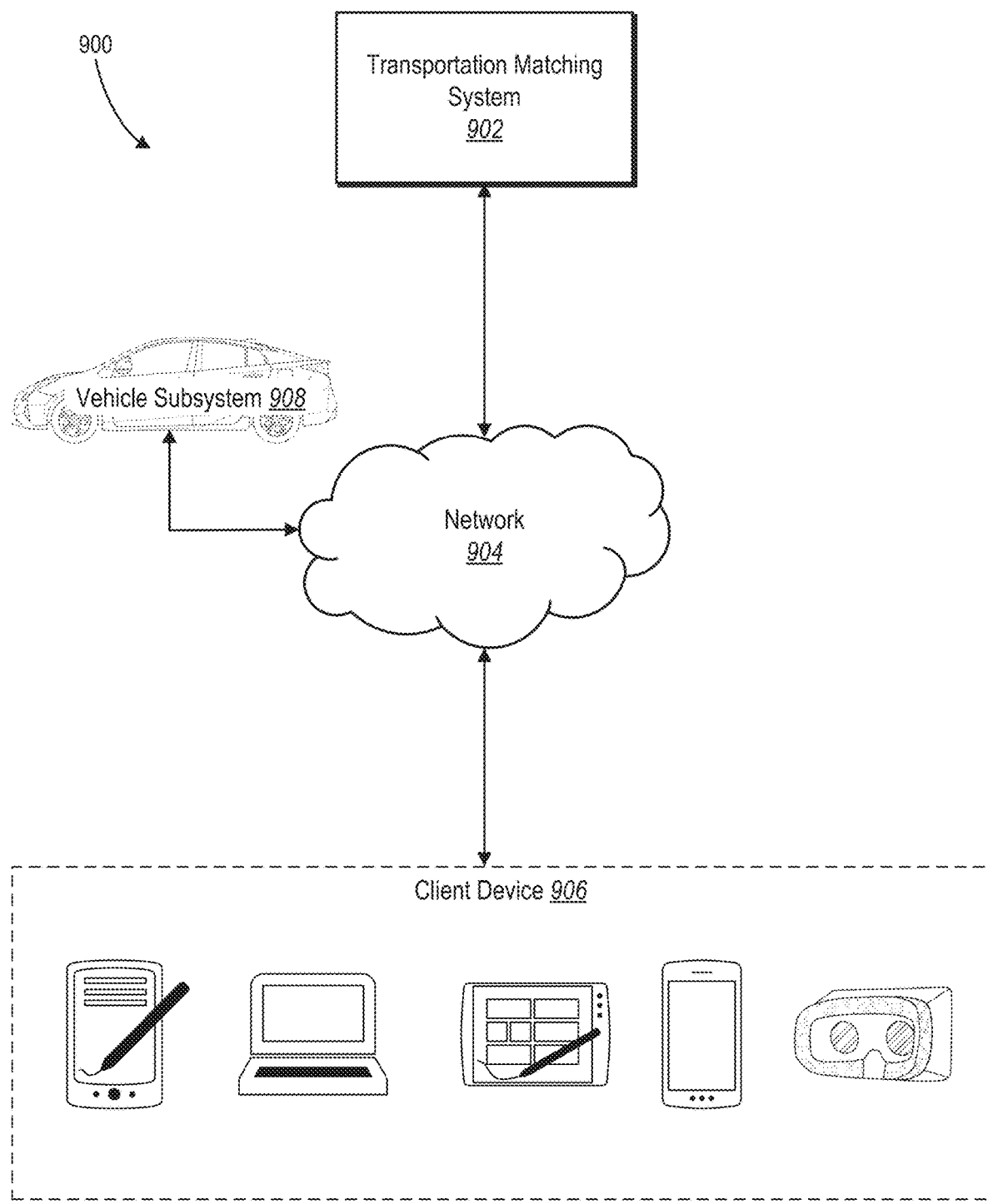
FIG. 9 illustrates an example network environment of a transportation matching system in accordance with one or more embodiments.

FIG. 9 illustrates an example network environment 900 of a transportation matching system (e.g., the transportation matching system 102). The network environment 900 includes a client device 906, a transportation matching system 902, and a vehicle subsystem 908 connected to each other by a network 904. Although FIG. 9 illustrates a particular arrangement of the client device 906, the transportation matching system 902, the vehicle subsystem 908, and the network 904, this disclosure contemplates any suitable arrangement of the client device 906, the transportation matching system 902, the vehicle subsystem 908, and the network 904. As an example, and not by way of limitation, two or more of the client device 906, the transportation matching system 902, and the vehicle subsystem 908 communicate directly, bypassing the network 904. As another example, two or more of the client device 906, the transportation matching system 902, and the vehicle subsystem 908 may be physically or logically co-located with each other in whole or in part. Moreover, although FIG. 9 illustrates a particular number of the client devices 906, the transportation matching systems 902, the vehicle subsystems 908, and the networks 904, this disclosure contemplates any suitable number of the client devices 906, the transportation matching systems 902, the vehicle subsystems 908, and the networks 904. As an example, and not by way of limitation, the network environment 900 may include multiple client devices 906, the transportation matching systems 902, the vehicle subsystems 908, and the networks 904.

This disclosure contemplates any suitable network 904. As an example, and not by way of limitation, one or more portions of the network 904 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. The network 904 may include one or more networks 904.

Links may connect the client device 906, the transportation matching system 902, and the vehicle subsystem 908 to the communication network 904 or to each other. This disclosure contemplates any suitable links. In particular embodiments, one or more links include one or more wireline (such as for example Digital Subscriber Line (DSL) or Data Over Cable Service Interface Specification (DOCSIS), wireless (such as for example Wi-Fi or Worldwide Interoperability for Microwave Access (WiMAX), or optical (such as for example Synchronous Optical Network (SONET) or Synchronous Digital Hierarchy (SDH) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout the network environment 900. One or more first links may differ in one or more respects from one or more second links.

In particular embodiments, the client device 906 may be an electronic device including hardware, software, or embedded logic components or a combination of two or more such components and capable of carrying out the appropriate functionalities implemented or supported by the client device 906. As an example, and not by way of limitation, a client device 906 may include any of the computing devices discussed above in relation to FIG. 8. A client device 906 may enable a network user at the client device 906 to access a network. A client device 906 may enable its user to communicate with other users at other client systems 906.

In particular embodiments, the client device 906 may include a transportation service application or a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at the client device 906 may enter a Uniform Resource Locator (URL) or other address directing the web browser to a particular server (such as server), and the web browser may generate a Hyper Text Transfer Protocol (HTTP) request and communicate the HTTP request to server. The server may accept the HTTP request and communicate to client device 906 one or more Hyper Text Markup Language (HTML) files responsive to the HTTP request. The client device 906 may render a webpage based on the HTML files from the server for presentation to the user. This disclosure contemplates any suitable webpage files. As an example, and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, the transportation matching system 902 may be a network-addressable computing system that can host a ride share transportation network. The transportation matching system 902 may generate, store, receive, and send data, such as, for example, user-profile data, concept-profile data, text data, ride request data, GPS location data, provider data, requester data, vehicle data, or other suitable data related to the ride share transportation network. This may include authenticating the identity of providers and/or vehicles who are authorized to provide ride services through the transportation matching system 902. In addition, the transportation service system may manage identities of service requestors such as users/requesters. In particular, the transportation service system may maintain requester data such as driving/riding histories, personal data, or other user data in addition to navigation and/or traffic management services or other location services (e.g., GPS services).

In particular embodiments, the transportation matching system 902 may manage ride matching services to connect a user/requester with a vehicle and/or provider. By managing the ride matching services, the transportation matching system 902 can manage the distribution and allocation of vehicle subsystem resources and user resources such as GPS location and availability indicators, as described herein.

The transportation matching system 902 may be accessed by the other components of the network environment 900 either directly or via network 904. In particular embodiments, the transportation matching system 902 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, the transportation matching system 902 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 906, or a transportation matching system 902 to manage, retrieve, modify, add, or delete, the information stored in data store.

In particular embodiments, the transportation matching system 902 may provide users with the ability to take actions on various types of items or objects, supported by the transportation matching system 902. As an example, and not by way of limitation, the items and objects may include ride share networks to which users of the transportation matching system 902 may belong, vehicles that users may request, location designators, computer-based applications that a user may use, transactions that allow users to buy or sell items via the service, interactions with advertisements that a user may perform, or other suitable items or objects. A user may interact with anything that is capable of being represented in the transportation matching system 902 or by an external system of a third-party system, which is separate from the transportation matching system 902 and coupled to the transportation matching system 902 via a network 904.

In particular embodiments, the transportation matching system 902 may be capable of linking a variety of entities. As an example, and not by way of limitation, the transportation matching system 902 may enable users to interact with each other or other entities, or to allow users to interact with these entities through an application programming interfaces (API) or other communication channels.

In particular embodiments, the transportation matching system 902 may include a variety of servers, sub-systems, programs, modules, logs, and data stores. In particular embodiments, the transportation matching system 902 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The transportation matching system 902 may also include suitable components such as network interfaces, security mechanisms, load balancers, failover servers, management-and-network-operations consoles, other suitable components, or any suitable combination thereof. In particular embodiments, the transportation matching system 902 may include one or more user-profile stores for storing user profiles. A user profile may include, for example, biographic information, demographic information, behavioral information, social information, or other types of descriptive information, such as work experience, educational history, hobbies or preferences, interests, affinities, or location.

The web server may include a mail server or other messaging functionality for receiving and routing messages between the transportation matching system 902 and one or more client systems 906. An action logger may be used to receive communications from a web server about a user's actions on or off the transportation matching system 902. In conjunction with the action log, a third-party-content-object log may be maintained of user exposures to third-party-content objects. A notification controller may provide information regarding content objects to a client device 906. Information may be pushed to a client device 906 as notifications, or information may be pulled from the client device 906 responsive to a request received from the client device 906. Authorization servers may be used to enforce one or more privacy settings of the users of the transportation matching system 902. A privacy setting of a user determines how particular information associated with a user can be shared. The authorization server may allow users to opt in to or opt out of having their actions logged by the transportation matching system 902 or shared with other systems, such as, for example, by setting appropriate privacy settings. Third-party-content-object stores may be used to store content objects received from third parties. Location stores may be used for storing location information received from the client systems 906 associated with users.

In addition, the vehicle subsystem 908 can include a human-operated vehicle or an autonomous vehicle. A provider of a human-operated vehicle can perform maneuvers to pick up, transport, and drop off one or more requesters according to the embodiments described herein. In certain embodiments, the vehicle subsystem 908 can include an autonomous vehicle—i.e., a vehicle that does not require a human operator. In these embodiments, the vehicle subsystem 908 can perform maneuvers, communicate, and otherwise function without the aid of a human provider, in accordance with available technology.

In particular embodiments, the vehicle subsystem 908 may include one or more sensors incorporated therein or associated thereto. For example, sensor(s) can be mounted on the top of the vehicle subsystem 908 or else can be located within the interior of the vehicle subsystem 908. In certain embodiments, the sensor(s) can be located in multiple areas at once—i.e., split up throughout the vehicle subsystem 908 so that different components of the sensor(s) can be placed in different locations in accordance with optimal operation of the sensor(s). In these embodiments, the sensor(s) can include a LIDAR sensor and an inertial measurement unit (IMU) including one or more accelerometers, one or more gyroscopes, and one or more magnetometers. The sensor suite can additionally or alternatively include a wireless IMU (WIMU), one or more cameras, one or more microphones, or other sensors or data input devices capable of receiving and/or recording information relating to navigating a route to pick up, transport, and/or drop off a requester.

In particular embodiments, the vehicle subsystem 908 may include a communication device capable of communicating with the client device 906 and/or the transportation matching system 902. For example, the vehicle subsystem 908 can include an on-board computing device communicatively linked to the network 904 to transmit and receive data such as GPS location information, sensor-related information, requester location information, or other relevant information.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
    continuously monitoring, by a transportation matching system comprising one or more servers, mobile application activity of a plurality of transportation providers to generate a log comprising inactivity times of the plurality of transportation providers and offline statuses of the plurality of transportation providers;
    identifying, from the plurality of transportation providers, a subset of low engagement transportation providers that correspond to inactivity times from the log that meet a threshold time period of inactivity and correspond to an offline status with a mobile application corresponding to the transportation matching system to indicate that the subset of low engagement transportation providers is offline on the mobile application;
    identifying a scheduled transportation request specifying a future request time and a future request location;
    selecting a transportation provider from the subset of low engagement transportation providers to service the scheduled transportation request by:
        generating a ranking of the plurality of transportation providers based on attributes associated with the plurality of transportation providers and attributes associated with the scheduled transportation request;
        excluding one or more transportation providers from the plurality of transportation providers not included within the subset of low engagement transportation providers, wherein the one or more transportation providers comprise a higher ranking than the subset of low engagement transportation providers for the scheduled transportation request; and
        selecting the transportation provider to service the scheduled transportation request from the generated ranking associated with the subset of low engagement transportation providers;
    providing, for display within a graphical user interface of a computing device associated with the selected transportation provider while the mobile application for the selected transportation provider is identified as offline from the log, a selectable push notification indicating the scheduled transportation request;
    receiving, via a user interaction within the graphical user interface, a user selection of the selectable push notification; and
    upon receiving the user selection of the selectable push notification, causing the computing device to access the mobile application corresponding to the transportation matching system to display, within a scheduled transportation user interface, exclusive access to a selectable user interface element for the scheduled transportation request to the selected transportation provider while preventing accessibility to the selectable user interface element for the scheduled transportation request on a displayed scheduled transportation user interface within other computing devices associated with other transportation providers.

2. The computer-implemented method of claim 1, wherein the selectable user interface element comprises an option to select the scheduled transportation request.

3. The computer-implemented method of claim 1, further comprising excluding the one or more transportation providers, from the plurality of transportation providers, from access to the selectable user interface element for the scheduled transportation request.

4. The computer-implemented method of claim 1, further comprising analyzing information associated with past activity of the plurality of transportation providers to identify the subset of low engagement transportation providers.

5. The computer-implemented method of claim 4, further comprising generating the ranking based at least on the past activity that indicates one or more reasons for low engagement to decrease a ranking of a transportation provider if the scheduled transportation request is associated with at least one of the one or more reasons for low engagement.

6. The computer-implemented method of claim 5, wherein the one or more reasons for low engagement comprises a threshold number of completed transportation requests comprising one or more characteristics of the scheduled transportation request or a threshold frequency of completed transportation requests comprising the one or more characteristics of the scheduled transportation request.

7. The computer-implemented method of claim 4, wherein the past activity comprises at least one of a log of transportation requests completed by the transportation provider, a log of when the transportation provider was online within the transportation matching system, and a log of interactions with the mobile application corresponding to the transportation matching system.

8. The computer-implemented method of claim 1 further comprising identifying the subset of low engagement transportation providers by determining, for each low engagement transportation provider, that a frequency of servicing transportation requests is less than a threshold frequency of servicing transportation requests, that a total time of servicing transportation requests is less than a threshold total time of servicing transportation requests, that a number of serviced transportation requests is less than a threshold number of serviced transportation requests, or an amount of time since a last serviced transportation request is greater than a threshold amount of time.

9. The computer-implemented method of claim 1, further comprising generating the ranking of the subset of low engagement transportation providers by:
inputting the attributes associated with the plurality of transportation providers and the attributes associated with the scheduled transportation request into a neural network; and
receiving a generated ranking of the plurality of transportation providers from the neural network.

10. The computer-implemented method of claim 1, wherein:
the attributes associated with the plurality of transportation providers comprise a home location, prior request locations, transportation provider preferences, transportation provider activity patterns, a likelihood of servicing the scheduled transportation request, ratings for previous transportation requests, feedback provided by transportation providers for previous transportation requests, or a likelihood of engagement; and
the attributes associated with the scheduled transportation request comprise the future request time, the future request location, a type of the future request location, a destination location, a type of the destination location, a value of the scheduled transportation request, or one or more requestor preferences.

11. The computer-implemented method of claim 1, further comprising providing the exclusive access to the selectable user interface element for the scheduled transportation request to the selected transportation provider for a first period of time that is displayed within the scheduled transportation user interface.

12. The computer-implemented method of claim 11, further comprising, after an expiration of the first period of time without the selected transportation provider claiming the scheduled transportation request, providing, for display and based on the generated ranking, exclusive access for the selectable user interface element for the scheduled transportation request to a second transportation provider from associated with the subset of low engagement transportation providers for a second period of time.

13. A non-transitory computer readable storage medium comprising instructions that, when executed by at least one processor, cause a computing device to:
continuously monitor mobile application activity of a plurality of transportation providers to generate a log comprising inactivity times of the plurality of transportation providers and offline statuses of the plurality of transportation providers;
identify, from the plurality of transportation providers, a subset of low engagement transportation providers that correspond to inactivity times from the log that meet a threshold time period of inactivity and correspond to an offline status with a mobile application corresponding to a transportation matching system to indicate that the subset of low engagement transportation providers is offline in the mobile application;
identify a scheduled transportation request specifying a future request time and a future request location;
select a transportation provider from the subset of low engagement transportation providers to service the scheduled transportation request by:
generating a ranking of the plurality of transportation providers based on attributes associated with the plurality of transportation providers and attributes associated with the scheduled transportation request;
excluding one or more transportation providers from the plurality of transportation providers not included within the subset of low engagement transportation providers, wherein the one or more transportation providers comprise a higher ranking than the subset of low engagement transportation providers for the scheduled transportation request; and
selecting the transportation provider to service the scheduled transportation request from the generated ranking associated with the subset of low engagement transportation providers;
provide, for display within a graphical user interface of a computing device associated with the selected transportation provider while the mobile application for the selected transportation provider is identified as offline from the log, a selectable push notification indicating the scheduled transportation request;
receive, via a user interaction within the graphical user interface, a user selection of the selectable push notification; and
upon receiving the user selection of the selectable push notification, causes the computing device to access the mobile application corresponding to the transportation matching system to display, within a scheduled transportation user interface, exclusive access to a selectable user interface element for the scheduled transportation request to the selected transportation provider while preventing accessibility to the selectable user interface element for the scheduled transportation request on a displayed scheduled transportation user interface within other computing devices associated with other transportation providers.

14. The non-transitory computer readable storage medium of claim 13, wherein the selectable user interface element comprises an option to select the scheduled transportation request.

15. The non-transitory computer readable storage medium of claim 13, further comprising instructions that, when executed by the at least one processor, cause the computing device to analyze information associated with past activity of the plurality of transportation providers to identify the subset of low engagement transportation providers, wherein the past activity comprises, for each of the plurality of transportation providers, a log of transportation requests completed by the transportation provider, a log of when the transportation provider was online within the transportation matching system, and a log of interactions with the mobile application corresponding to the transportation matching system.

16. The non-transitory computer readable storage medium of claim 13, wherein the attributes associated with the plurality of transportation providers comprise a home location, prior request locations, transportation provider preferences, transportation provider activity patterns, a likelihood of servicing the scheduled transportation request, ratings for previous transportation requests, feedback provided by transportation providers for previous transportation requests, or a likelihood of engagement.

17. The non-transitory computer readable storage medium of claim 13, wherein the attributes associated with the scheduled transportation request comprise the future request time, the future request location, a type of the future request location, a destination location, a type of the destination location, a value of the scheduled transportation request, or one or more requestor preferences.

18. The non-transitory computer readable storage medium of claim 13, further comprising instructions that, when executed by the at least one processor, cause the computing device to:
   provide the exclusive access to the selectable user interface element for the scheduled transportation request to the selected transportation provider for a first period of time; and
   after an expiration of the first period of time without the selected transportation provider claiming the scheduled transportation request, provide, for display, open access for the selectable user interface element for the scheduled transportation request on the displayed scheduled transportation user interface within the other computing devices associated with the other transportation providers.

19. A system comprising:
   at least one processor; and
   at least one non-transitory computer readable medium storing instructions thereon that, when executed by the at least one processor, causes the system to:
      continuously monitor mobile application activity of a plurality of transportation providers to generate a log comprising inactivity times of the plurality of transportation providers and offline statuses of the plurality of transportation providers;
      identify, from the plurality of transportation providers, a subset of low engagement transportation providers that correspond to inactivity times from the log that meet a threshold time period of inactivity and correspond to an offline status with a mobile application corresponding to a transportation matching system to indicate that the subset of low engagement transportation providers is offline in the mobile applications;
      identify a scheduled transportation request specifying a future request time and a future request location;
      select a transportation provider from the subset of low engagement transportation providers to service the scheduled transportation request by:
         generating a ranking of the plurality of transportation providers based on attributes associated with the plurality of transportation providers and attributes associated with the scheduled transportation request;
         excluding one or more transportation providers from the plurality of transportation providers not included within the subset of low engagement transportation providers, wherein the one or more transportation providers comprise a higher ranking than the subset of low engagement transportation providers for the scheduled transportation request; and
         selecting the transportation provider to service the scheduled transportation request from the generated ranking associated with the subset of low engagement transportation providers;
      provide, for display within a graphical user interface of a computing device associated with the selected transportation provider while the mobile application for the selected transportation provider is identified as offline from the log, a selectable push notification indicating the scheduled transportation request;
      receive, via a user interaction within the graphical user interface, a user selection of the selectable push notification; and
      upon receiving the user selection of the selectable push notification, causes the computing device to access the mobile application corresponding to the transportation matching system to display, within a scheduled transportation user interface, exclusive access to a selectable user interface element for the scheduled transportation request to the selected transportation provider while preventing accessibility to the selectable user interface element for the scheduled transportation request on a displayed scheduled transportation user interface within other computing devices associated with other transportation providers.

20. The system of claim 19, wherein the selectable user interface element comprises an option to select the scheduled transportation request.

* * * * *